United States Patent
Schwital et al.

(10) Patent No.: US 12,011,014 B2
(45) Date of Patent: Jun. 18, 2024

(54) METHOD FOR PRODUCING DECAFFEINATED RAW COFFEE BEANS, DECAFFEINATED ROASTED COFFEE BEANS OR PREPARATIONS PRODUCED THEREFROM, CORRESPONDING DECAFFEINATED RAW COFFEE BEANS, DECAFFEINATED ROASTED COFFEE BEANS AND PREPARATION PRODUCED THEREFROM, CORRESPONDING USES AND CORRESPONDING SYSTEMS

(71) Applicant: ANKA Angewandte Kaffeetechnologie GmbH, Bremen (DE)

(72) Inventors: Jan Christoph Schwital, Hamburg (DE); Oliver Süsse-Herrmann, Hude (DE)

(73) Assignee: ANKA ANGEWANDTE KAFFEETECHNOLOGIE GMBH, Bremen (DE)

( * ) Notice: Subject to any disclaimer, the term of this patent is extended or adjusted under 35 U.S.C. 154(b) by 0 days.

(21) Appl. No.: 17/795,710

(22) PCT Filed: Jan. 14, 2021

(86) PCT No.: PCT/EP2021/050724
§ 371 (c)(1),
(2) Date: Nov. 9, 2022

(87) PCT Pub. No.: WO2021/151685
PCT Pub. Date: Aug. 5, 2021

(65) Prior Publication Data
US 2023/0071419 A1    Mar. 9, 2023

(30) Foreign Application Priority Data
Jan. 28, 2020 (EP) ................................... 20154208

(51) Int. Cl.
*A23F 5/02* (2006.01)
*A23F 5/04* (2006.01)
*A23F 5/20* (2006.01)

(52) U.S. Cl.
CPC ............. *A23F 5/02* (2013.01); *A23F 5/046* (2013.01); *A23F 5/206* (2013.01)

(58) Field of Classification Search
CPC ...... A23F 5/02; A23F 5/16; A23F 5/24; A23F 5/00; A23F 5/36
See application file for complete search history.

(56) References Cited

U.S. PATENT DOCUMENTS

| 4,911,941 A | 3/1990 | Katz |
| 5,443,709 A | 8/1995 | Crose |
| 8,067,216 B2 | 11/2011 | Swoboda |
| 2016/0037807 A1 | 2/2016 | Hendriksen |

FOREIGN PATENT DOCUMENTS

| CN | 107223746 A | * 10/2017 | ............... A23F 5/02 |
| DE | 102019218199 A1 | * 5/2021 | ............... A23F 5/02 |
| EP | 0313921 A2 | 5/1989 | |
| EP | 2544552 B1 | 4/2014 | |
| EP | 1906772 B1 | 7/2015 | |
| FR | 2459001 A1 | * 1/1981 | ............... A23F 5/16 |

OTHER PUBLICATIONS

FR 2459001 A1, Alois Raemy et al. English Machine Translation, Jan. 9, 1981, pp. 1-6 (Year: 1981).*
Popper et al., DE 102019218199 A1, English Machine Translation, pp. 1-9, date filed Nov. 25, 2019 (Year: 2019).*
Chen, Sha, CN-107223746-A, Machine Translation, English, published Oct. 3, 2017 (Year: 2017).*
Barbosa-Pereira, L., et al., "Pulsed Electric Filed Assisted Extraction of Bioactive Compounds from Cocoa Bean Shell and Cofee Silverskin," Food and Bioprocess Technology, Jan. 2018, vol. 11, pp. 818-835.
Nedomová, S., et al., "Strength of Coffee Beans Under Static and Dynamic Loading," Acta Universitatis Agriculturae et Silviculturae Mendelianae Brunensis, May 2013, 61(3): 743-749.
Textbook, "The Craft and Science of Coffee," Edited by Britta Folmer, 2017 Elsevier Inc., ISBN 978-0-12-803520-7.

* cited by examiner

*Primary Examiner* — Hong T Yoo
(74) *Attorney, Agent, or Firm* — DUANE MORRIS LLP; Gregory M. Lefkowitz; Brandon A. Chan

(57) ABSTRACT

A process for producing decaffeinated green coffee beans, decaffeinated roasted coffee beans or preparations produced therefrom is described, wherein one process step comprises the PEF (pulsed electric field) treatment of (optionally presoaked) green coffee beans. Also described is a decaffeinated green coffee bean, a decaffeinated roasted coffee bean, and a preparation produced therefrom, and also the use of a PEF device for the treatment of (optionally presoaked) green coffee beans. A system for decaffeinating green coffee beans is additionally described.

15 Claims, 14 Drawing Sheets

Figure 1:
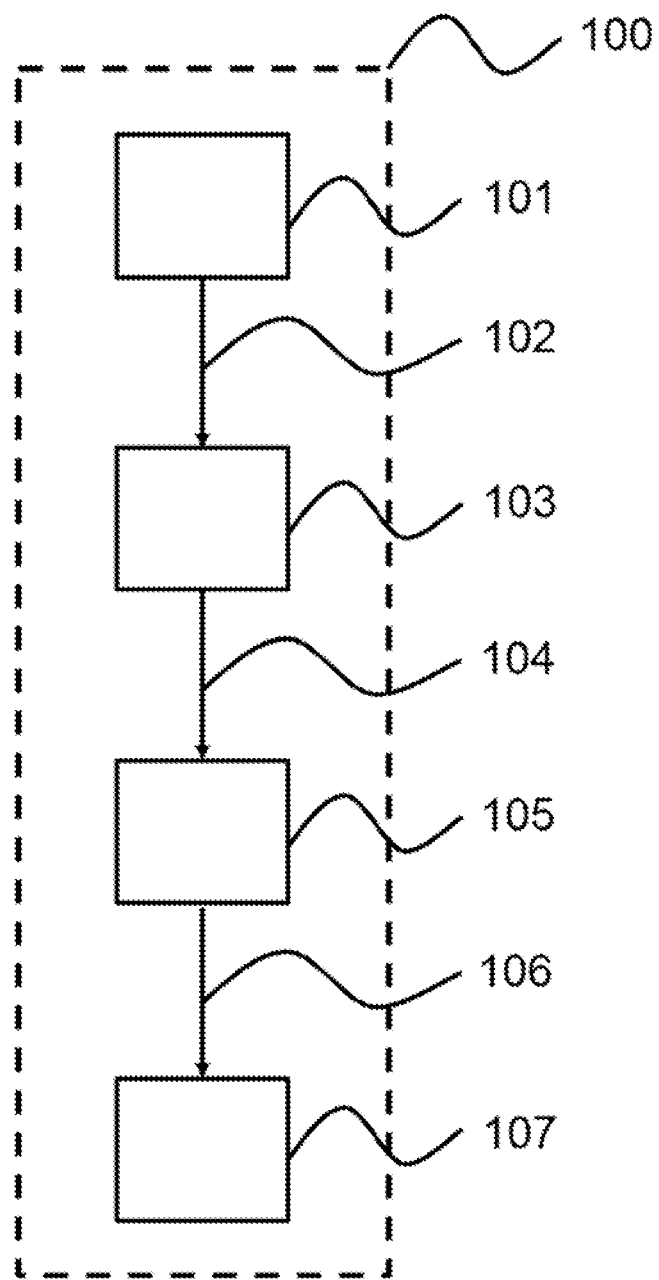

METHOD FOR PRODUCING DECAFFEINATED RAW COFFEE BEANS, DECAFFEINATED ROASTED COFFEE BEANS OR PREPARATIONS PRODUCED THEREFROM, CORRESPONDING DECAFFEINATED RAW COFFEE BEANS, DECAFFEINATED ROASTED COFFEE BEANS AND PREPARATION PRODUCED THEREFROM, CORRESPONDING USES AND CORRESPONDING SYSTEMS

CROSS-REFERENCE TO RELATED APPLICATIONS

This application is a § 371 national stage entry of International Application No. PCT/EP2021/050724, filed on Jan. 14, 2021, which claims priority to European Patent Application No. 20154208.1, filed on Jan. 28, 2020, the entire contents of which are incorporated herein by reference.

The present invention relates to a process for producing decaffeinated green coffee beans, decaffeinated roasted coffee beans or preparations produced therefrom, wherein one process step comprises the PEF (pulsed electric field) treatment of (optionally presoaked) green coffee beans. The invention is defined in the appended claims; certain definitions of terms are included in the description. Further details and preferred configurations of the process of the invention result from the appended claims and from the description hereinbelow. The present invention relates also to a decaffeinated green coffee bean, to a decaffeinated roasted coffee bean, and to a preparation produced therefrom. The present invention relates also to the use of a PEF device for the treatment of (optionally presoaked) green coffee beans. The present invention relates also to a system for decaffeinating green coffee beans. In each case, details and preferred configurations result from the appended claims and from the description hereinbelow.

The decaffeination of green coffee beans is a common process for producing decaffeinated coffee. The green coffee beans are normally decaffeinated in an extraction process involving organic and/or inorganic extractants. These extractants have to meet various requirements; for example it is important how well and how selectively caffeine is able to be extracted into the particular extractant. Costs, ease of handling, legal restrictions, and availability also play a role in the selection of a suitable extractant.

Before undergoing an extraction process for the purposes of decaffeination, green coffee beans are normally presoaked with water and/or steam and/or another swelling liquid (see definition hereinbelow). This process usually results in an increase in the volume of the green coffee beans and in facilitation of the diffusion of substances inside the green coffee bean and of diffusion processes over its exterior surface. In many cases, it is only such presoaking that permits the subsequent caffeine extraction to be carried out in an economically viable manner (cf. Chapter 10 in textbook "The Craft and Science of Coffee", Elsevier, 2017, ISBN 978-0-12-803520-7, edited by Britta Vollmer).

After the extraction process, which is carried out on presoaked green coffee beans (and before subsequent roasting of the decaffeinated green coffee beans), the swelling liquid (for example water) that has penetrated into the green coffee beans during presoaking must first be removed by drying. This is a process that is time-, energy- and cost-intensive, consequently there is a need to use as little soaking liquid as possible for presoaking the green coffee beans and to make it easier to remove the soaking liquid from the green coffee beans, the aim being to avoid disadvantages in decaffeination performance.

For efficient decaffeination (i.e. extraction of caffeine from green coffee beans), the caffeine should be soluble in the chosen extractant. Extractants in which caffeine is readily soluble (e.g. dichloromethane, ethyl acetate, water) are often used, but these do not dissolve caffeine very specifically and are instead likewise good solvents and extractants for other substances present in the green coffee bean. The use of such solvents and extractants allows caffeine to be extracted efficiently from the green coffee bean, but flavor substances and/or other active substances are also extracted to an undesirable degree, consequently the use of such solvents and extractants affects the taste and/or the other effect of the coffee preparations produced from the green coffee beans decaffeinated in this way. Other extractants (for example liquid carbon dioxide) do not dissolve caffeine particularly well, but they do so very specifically. When such extractants are used, caffeine can be extracted from the presoaked green coffee beans without flavor substances and/or other active substances being extracted at the same time. However, the overall poor solubility of caffeine in these specifically extracting extractants means that their use is associated with considerable extra costs compared to extractants having higher caffeine solubility.

There is therefore a need to reduce processing costs in decaffeination. In particular when using solvents that are selective for caffeine but have weak dissolving power, such as liquid carbon dioxide.

During treatment of green coffee beans (especially of presoaked green coffee beans), microbial processes occur that can lead to taste impairments in the (decaffeinated) preparations subsequently produced from said green coffee beans. There is therefore a need in the field of the present invention to minimize these microbial processes.

EP 0 313 921 A2 discloses a process for the gentle decaffeination of green coffee, characterized essentially by the process steps a) presoaking of the green coffee with added soaking liquid; b) extracting of the caffeine with an aqueous solution; c) adsorbing of the caffeine on a pretreated adsorbent; d) drying of the decaffeinated beans to their original moisture content, with at least one of the process steps carried out with exclusion of oxygen, more particularly in an inert gas atmosphere.

The textbook "The Craft and Science of Coffee", Elsevier, 2017, ISBN 978-0-12-803520-7, edited by Britta Vollmer describes various aspects of coffee cultivation and coffee processing. In particular, chapter 10 of the textbook describes in detail the state of the art with regard to coffee decaffeination.

U.S. Pat. No. 5,443,709 A discloses a device for separating caffeine from a liquid.

U.S. Pat. No. 4,911,941 A discloses a process for decaffeinating coffee.

In the coffee industry there is a need to (i) use green coffee beans having a low bacterial load and/or to (ii) reduce the existing bacterial load of green coffee beans during processing.

In the coffee industry it is generally desirable, after the caffeine has been extracted, to reduce the moisture content of presoaked green coffee beans back down to a moisture content that is preferred for further processing, especially to a moisture content of 8% to 13% by weight based on the total mass of the green coffee beans, while expending for this purpose as little energy as possible. In particular, it is desirable, after the caffeine has been extracted, to reduce the moisture content of presoaked green coffee beans back down to a moisture content that is preferred for further processing, especially to a moisture content of 8% to 13% by weight, and to employ the lowest possible temperatures for this purpose, preferably in order to be able to preserve flavor substances during the drying process. In addition it is generally desirable, after the caffeine has been extracted, to reduce, by drying, the moisture content of presoaked green coffee beans back down to a moisture content that is preferred for further processing, especially to a moisture content of 8% to 13% by weight, and to use the shortest possible drying times for this purpose, for example in order to be able to advantageously preserve flavor substances during the drying process.

In the coffee industry the aim in systems for presoaking green coffee beans, for decaffeinating green coffee beans, and for drying (decaffeinated) green coffee beans is to achieve the highest possible mass flow of green coffee beans without adversely affecting the quality of the resulting products of the respective process and/or of the coffee preparations producible or produced therefrom.

In the coffee industry it is generally desirable to decaffeinate green coffee beans with extractants, preferably with extractants that have a high specificity for caffeine, while using for this purpose as little energy as possible. Moreover, it is generally desirable to decaffeinate green coffee beans with extractants, preferably with extractants that have a high specificity for caffeine, while being able to use the shortest possible extraction times for this purpose. This process should each time preferably result in low caffeine values in the extracted green coffee beans.

The present invention is defined in the claims and detailed hereinbelow.

The present invention relates to
- a process for producing decaffeinated green coffee beans, decaffeinated roasted coffee beans or preparations produced therefrom,
- decaffeinated green coffee beans, decaffeinated roasted coffee beans and preparations produced therefrom,
- the use of a PEF device for the treatment of green coffee beans, and
- a system for decaffeinating green coffee beans.

Particular embodiments, aspects or properties that are described in connection with one of these categories, or that are described as preferred, in each case apply correspondingly/by analogy to the other categories too, and vice versa.

Unless otherwise stated, preferred aspects or embodiments of the invention and of the various categories thereof can be combined with other aspects or embodiments of the invention and of the various categories thereof, especially with other preferred aspects or embodiments. Combinations with one another of aspects or embodiments that are preferred in each case result in turn in aspects or embodiments of the invention that are preferred.

According to a primary aspect of the present invention, the tasks and problems specified above are solved in whole or in part by a process for producing decaffeinated green coffee beans, decaffeinated roasted coffee beans or preparations produced therefrom, comprising the following steps:
(b) PEF-treating of green coffee beans (presoaked or non-presoaked), with the result that PEF-treated (presoaked or non-presoaked) green coffee beans are obtained,
(c) extracting of caffeine from the PEF-treated green coffee beans using an extraction liquid, with the result that decaffeinated, PEF-treated green coffee beans are obtained.

The process comprises the indicated steps, but further process steps can be carried out before, after or between these steps. The person skilled in the art will select such additional steps and/or intermediate steps him/herself according to the requirements in the individual case.

The "decaffeinated roasted green coffee beans" are a product or (secondary) intermediate product that uses decaffeinated green coffee beans (as primary intermediate product) in its production.

The "preparations produced therefrom" are products produced using decaffeinated green coffee beans and/or decaffeinated roasted green coffee beans produced in the process of the invention. The "preparations produced therefrom" include foodstuffs and semiluxury foods in particular. The term "preparations produced therefrom" therefore includes (in addition to many other coffee preparations) in particular also: espresso, ristretto, bica, lungo, americano, long black, café latte, caffè breve, caffè macchiato, cappuccino, flat white, galao, latte macchiato, mocha, café con leche, cortado, filter coffee, brewed coffee, coffee prepared with a percolator, vacuum-brewed coffee, French-press brewed coffee, cold-brew coffee, white coffee, café au lait, kopi tubruk, Indian filter coffee, Greek coffee, Turkish coffee, tinto, Indochinese-style coffee, green coffee, coffee powder, instant coffee, chocolate containing added coffee, roasted coffee beans coated in chocolate, and mixtures of one or more of said preparations and/or mixtures of one or more of said preparations with further ingredients.

In the present text, the term "decaffeination" is understood as meaning a reduction of the caffeine content. A green coffee bean thus after decaffeination has a lower caffeine content than before decaffeination.

The term "green coffee bean" refers to coffee beans from which the outer skin and pulp as well as the parchment layer and mucilage thereon have been removed. According to the invention, any green coffee beans may be used (Coffea arabica, Coffea canephora var. robusta and others). Green coffee beans may be presoaked or non-presoaked. In preferred embodiments of the process of the invention, the green coffee beans to be subjected to PEF treatment are first presoaked and/or adjusted to a specific moisture content, cf. the detailed explanations hereinbelow.

The term "coffee bean" encompasses (i) green coffee beans (non-presoaked), (ii) presoaked green coffee beans, (iii) PEF-treated green coffee beans, (iv) PEF-treated, presoaked green coffee beans, (v) decaffeinated, PEF-treated green coffee beans, (vi) decaffeinated, PEF-treated, presoaked green coffee beans, (vii) PEF-treated, dried, decaffeinated green coffee beans, and (viii) roasted, PEF-treated, dried, decaffeinated coffee beans.

"PEF treatment" of green coffee beans means that the (optionally presoaked) green coffee beans are exposed to a pulsed electric field.

In the process of the invention, the PEF treatment of green coffee beans preferably results in changes to the cell walls and cell membranes in the green coffee beans. Particularly preferably, these changes consist in the cell walls and cell membranes becoming perforated. These changes are preferably detectable by scanning electron microscopy (SEM), transmission electron microscopy (TEM), cryo-transmission electron microscopy (cryo-TEM) or atomic force microscopy (AFM) or by a combination of said methods.

The decaffeinated, PEF-treated, optionally presoaked green coffee beans obtained in the process of the invention are normally processed further in a number of subsequent steps. In many of these subsequent steps, the mechanical stability of the decaffeinated, PEF-treated green coffee beans is important. For example, it is undesirable for the decaffeinated, PEF-treated green coffee beans to fracture or be otherwise mechanically compromised during drying; the required stability can in practice easily be ensured.

The dried, decaffeinated, PEF-treated green coffee beans preferably have particularly high stability in order for them to be particularly well suited for further processing steps such as transfer, transport, and the roasting process.

The person skilled in the art will routinely carry out the PEF treatment in step (b) or in step (b-v) on an industrial scale in such a way that the fracture behavior of the resulting dried, decaffeinated, PEF-treated green coffee beans is not adversely affected, or preferably is in fact improved, compared to (optionally presoaked) green coffee beans that with otherwise identical treatment have not undergone step (b) (PEF treatment) or step (b-v) (PEF treatment of presoaked green coffee beans). Preferably, the fracture behavior is improved by virtue of an increase in elasticity resulting from the PEF treatment. The fracture behavior of green coffee beans or of coffee beans is preferably determined according to the "dynamic loading" method described by Nedomová, Trnka, Stoklasová, and Buchar in the specialist article "Strength of coffee beans under static and dynamic loading", 2013 (doi: 10.11118/actaun201361030743), on page 745. In many cases it is preferable that the values for the breaking force and/or the strain at fracture are by virtue of the PEF treatment in step (b) or in step (b-v) of the present invention increased by more than 5%, particularly preferably by more than 7%, very particularly preferably by more than 10%. A comparison is consequently made here with green coffee beans that, with otherwise identical treatment, have not undergone step (b) (PEF treatment) or step (b-v) (PEF treatment of presoaked green coffee beans).

In order to reduce process costs in the decaffeination of green coffee beans (especially with extractants specific for caffeine, such as liquid carbon dioxide), the inventors have explored a large number of considerations and carried out investigations.

Since the inventors had been aware that the caffeine extraction step is speed-determining for the process overall, they first of all sought to optimize the parameters for process control in the caffeine extraction step. However, despite intensive efforts, this approach has thus far likewise proved unsuccessful. Attempts to find an alternative extractant that, alongside high specificity, permits more rapid caffeine extraction than the caffeine-specific extractants (such as liquid carbon dioxide) known in the coffee industry have thus far likewise been unsuccessful.

Ultimately, it had therefore begun to be accepted that the actual extraction process probably could not be optimized.

The inventors accordingly considered modifying the customary step of presoaking the green coffee beans prior to the extraction process, or replacing this with different processes, in order to find a different, more efficient form of preparation for the extraction.

A large number of experiments with different approaches and methods were initially disappointing.

It was however surprisingly found in further experiments that a prior PEF treatment resulted in a considerable and ultimately significant improvement in the efficiency of the extraction of caffeine from the green coffee beans pretreated in this way. An extraction of such efficiency cannot be achieved without PEF treatment.

In addition, it was surprisingly found that the green coffee beans treated in this way (first PEF-treated, then decaffeinated) are dried more effectively in certain drying processes, especially in fluidized-bed drying, than comparable green coffee beans that, with otherwise identical treatment, had not undergone the PEF treatment step.

Furthermore, it was surprisingly found in our own experiments that the breaking strength of the green coffee beans is not adversely affected by the PEF treatment prior decaffeination, but is in fact slightly increased.

Our own investigations have moreover shown that the taste and aroma of the corresponding coffee preparations are likewise not adversely affected by the PEF treatment.

PEF treatments of foodstuffs have already been described in individual cases:

EP 2 544 552 B1 discloses a process for treating chicory pieces that includes a step of steeping unroasted chicory pieces in an aqueous solution containing divalent cations, followed by a step of steaming the chicory pieces. The document also discloses that a pulsed electric field is applied to the chicory pieces during the steeping step.

Document US 2016/0037807 A1 discloses a method for reducing the asparagine content of foodstuffs destined for heat treatment. The document also discloses that potato pieces are treated with a pulsed electric field before steeping in water.

Document EP 1 906 772 B1 discloses a process for treating potatoes, comprising the application of an electric field in the form of a pulsed electric field to the potatoes.

The dissertation "Pulsed electric fields—Influence on physiology, structure and extraction processes of the oleaginous yeast Waltomyces lipofer" by the author Dennis Raschke, Technical University of Berlin, 2010, discloses the influence of pulsed electric fields on yeast cells of the type Waltomyces lipofer.

The document "DLG Expert Knowledge 5/2018" describes the use of pulsed electric fields (PEF) in the food industry.

The document "Pulsed Electric Field Assisted Extraction of Bioactive Compounds from Cocoa Bean Shell and Coffee Silverskin" by the authors Letricia Barbosa-Pereira, Alessandro Guglielmetti, and Giuseppe Zeppa (in: "Food and Bioprocess Technology" 2008, vol. 11, pp. 818-835; https://doi.org/10.1007/s11947-017-2045-6) discloses the extraction of bioactive substances from coffee silverskins that had undergone prior grinding into a powder. The document also discloses that one of the extracted bioactive substances is caffeine. Also disclosed is that the coffee silverskins were ground to a powder and subsequently exposed to a pulsed electric field prior to the extraction.

On the basis of his/her specialist knowledge, the person skilled in the art will individually select for the process of the invention a suitable extraction liquid.

Preference is given to a process according to the invention (as described above, preferably as referred to above as preferred) comprising the following steps:
  (a-v) presoaking of green coffee beans with swelling liquid, with the result that presoaked green coffee beans are obtained, preferably presoaked green coffee beans having a predetermined moisture content,
  (b-v) subjecting the presoaked green coffee beans to PEF treatment, with the result that PEF-treated, presoaked green coffee beans are obtained,
  (c-v) extracting of caffeine from the PEF-treated, presoaked green coffee beans using an extraction liquid, with the result that decaffeinated, PEF-treated, presoaked green coffee beans are obtained.

The term "swelling liquid" refers to a substance that at 25° C. and an ambient pressure of 101 325 Pa is liquid and that is intended to be used or is used to penetrate a solid body (for example a green coffee bean) and (commonly) to bring about an increase in the volume of the solid body (for example a green coffee bean). A green coffee bean thus after presoaking with swelling liquid often has a larger volume than before presoaking with swelling liquid.

The moisture content of green coffee beans can vary over a wide range. The result of step (a-v) is a presoaked green coffee bean.

A green coffee bean is said to be "presoaked" if it has been in contact with a swelling liquid and at least part of the swelling liquid has penetrated into the green coffee bean; this can be confirmed for example by differential weighing. A presoaked green coffee bean preferably has an increased volume.

A green coffee bean to be subjected to PEF treatment in step (b) or (b-v) preferably has a moisture content of at least 15% by weight, preferably a moisture content within a range from 15% by weight to 55% by weight, particularly preferably a moisture content within a range from 35% by weight to 50% by weight, very particularly preferably a moisture content within a range from 35% by weight to 45% by weight, in each case based on the total mass of the presoaked green coffee bean determined in accordance with ISO 6673.

Preference is given to a process according to the invention (as described above, preferably as referred to above as preferred) wherein the swelling liquid is an aqueous swelling liquid.

On the basis of his/her specialist knowledge and the needs in the individual case, the person skilled in the art will individually select the swelling liquid used in the process of the invention. In many cases, it is however particularly preferable to use an aqueous swelling liquid. The steam that is often used with preference is according to the definition above an aqueous swelling liquid.

In many cases, an aqueous swelling liquid is preferred as the swelling liquid, since this results in particularly effectively presoaking of the green coffee beans; at the same time, the use of an aqueous swelling liquid is in many cases environmentally friendly and/or particularly cost-effective.

As the aqueous swelling liquid, it is in many cases preferable to use water (drinking water within the meaning of the German Drinking Water Ordinance in the version dated 8 Jan. 2018 (published in the Federal Law Gazette, demineralized water, distilled water or the like) or steam without the addition of other substances. In this case, no relevant amounts of undesirable additives remain in the coffee bean when the swelling liquid (i.e. the water) is later removed. This means that no separate analyses to monitor toxicological limits or limits under food law are necessary.

Preference is given to a process according to the invention (as described above, preferably as referred to above as preferred) wherein the extraction liquid is selected from the group consisting of:
  liquid carbon dioxide, supercritical carbon dioxide, dichloromethane, dichloroethane, ethanol, trichloromethane, trichloroethane, acetone, ethyl acetate, methyl acetate, methanol, coffee oil, and water,
The extraction liquid is particularly preferably selected from the group consisting of:
  water, ethyl acetate, liquid carbon dioxide, supercritical carbon dioxide, and dichloromethane
The extraction liquid is very particularly preferably selected from the group consisting of:
  liquid carbon dioxide and dichloromethane.
Most preferably, the extraction liquid is liquid carbon dioxide.

The use according to the invention of extractants and extractant mixtures other than the preferred ones recited here is also possible, but the use thereof is generally less preferred.

Preference may be given by the person skilled in the art to any of the specified extraction liquids, depending on the requirements in the individual case, with regard to their dissolving behavior for caffeine and specific flavor substances in the individual case. When selecting a suitable extractant, the person skilled in the art will also take into account, besides the dissolving behavior of the respective extractant, other factors in the individual case and combinations of such factors; these include by way of example and not exhaustively: specific requirements relating to the outcome of the extraction, the extraction temperature, the apparatus design in individual cases, legal regulations at his/her place of work, costs and/or availability of the extractant, environmental compatibility, and customer acceptance.

The extraction liquid is particularly preferably selected from the group consisting of liquid carbon dioxide and dichloromethane. Very particular preference is given to the use of liquid carbon dioxide as the extraction liquid.

Preference is given to a process according to the invention (as described above, preferably as referred to above as preferred) comprising the following additional step:
  (d) drying of the decaffeinated, PEF-treated green coffee beans, preferably decaffeinated, PEF-treated, presoaked green coffee beans (more particularly when performing steps (a-v), (b-v), and (c-v)), with the result that dried, decaffeinated green coffee beans are obtained, preferably dried, decaffeinated green coffee beans having a predetermined moisture content.

After decaffeination, it is in many cases necessary or at least preferable to dry the decaffeinated, PEF-treated, optionally presoaked green coffee beans, with the result that dried, decaffeinated, optionally presoaked, PEF-treated green coffee beans are obtained, preferably dried, decaffeinated green coffee beans having a predetermined moisture content.

Preferably, the moisture content of the decaffeinated, PEF-treated, optionally presoaked green coffee beans in the step of "drying of the decaffeinated, PEF-treated green coffee beans" is reduced by at least 10% based on the total mass of the green coffee beans before drying, preferably by at least 20%, particularly preferably by at least 30%, very particularly preferably by at least 35%; the determination is carried out in accordance with ISO 6673.

Preferably, the bulk density of the decaffeinated, PEF-treated, optionally presoaked green coffee beans in the step of "drying of the decaffeinated, PEF-treated green coffee beans" is increased by at least 10%, preferably by at least 20%, particularly preferably by at least 30%, very particularly preferably by at least 35%; the determination of bulk density (free flow) is carried out in accordance with ISO 6669.

Advantageously, a defined reduction in the moisture content (determined in accordance with ISO 6673) of the decaffeinated, PEF-treated, optionally presoaked green coffee beans in the step of "drying of the decaffeinated, PEF-treated green coffee beans" is possible with less energy consumption or energy use than the same defined reduction in moisture content for the same amount of decaffeinated, non-PEF-treated, optionally presoaked green coffee beans (the process design being identical aside from the PEF treatment).

Preference is given to a process according to the invention (as described above, preferably as referred to above as preferred) wherein the drying of the decaffeinated, PEF-treated green coffee beans, preferably the drying of the decaffeinated, PEF-treated, presoaked green coffee beans (i.e. more particularly when performing steps (a-v), (b-v), and (c-v)), is carried out by means of a process selected from the group consisting of:

fluidized-bed processes, vacuum-drying processes, vibration drying, freeze drying, hot-air drying, microwave drying, infrared drying, and combinations thereof.

Preferably it is selected from the group consisting of: fluidized bed processes, vacuum drying processes, and combinations thereof, wherein the drying process preferably comprises at least fluidized-bed drying, particularly preferably in combination with vacuum drying, and wherein it is very particularly preferable that vacuum drying is first carried out and then fluidized-bed drying.

The use according to the invention of drying processes other than those recited here is also possible, but the use thereof is generally less preferred. The person skilled in the art will select a drying process that is suitable for the requirements in the individual case.

Other suitable processes for drying the decaffeinated, PEF-treated green coffee beans, preferably the decaffeinated, PEF-treated, presoaked green coffee beans, are known from the prior art and may likewise be used in accordance with the invention, either individually or in combination or in succession, as an alternative to or in addition to the preferred drying process.

The person skilled in the art will know other suitable processes for drying from the prior art and will select the appropriate process(es) him/herself according to the requirements in the individual case.

In many cases, it is particularly preferable to first carry out vacuum drying to predry to a moisture content of approx. 20 to 30% (based on the total mass of the coffee beans, determination in accordance with ISO 6673), followed by fluidized-bed drying, since the use of the decaffeinated, PEF-treated green coffee beans or of the decaffeinated, PEF-treated, presoaked green coffee beans in fluidized-bed drying in particular allows particularly advantageously improved drying rates to be achieved compared to decaffeinated, non-PEF-treated green coffee beans or decaffeinated, not PEF-treated, presoaked green coffee beans.

Preference is given to a process according to the invention (as described above, preferably as referred to above as preferred) wherein the PEF treatment creates irreversible pores in the cell membranes and cell walls of the green coffee beans (presoaked or non-presoaked).

In the process of the invention, the PEF treatment of green coffee beans is preferably carried out sufficiently gently that irreversible pores form in the cell membranes and cell walls of the green coffee beans, but without adverse effect on the breaking strength of the roasted coffee beans produced therefrom, in each case compared to roasted coffee beans of the same type and batch that had previously undergone the same process steps, but without PEF treatment. The breaking strength (breaking force) is in each case determined using the "dynamic loading" method described by Nedomová, Trnka, Stoklasová, and Buchar in the specialist article "Strength of coffee beans under static and dynamic loading", 2013 (doi: 10.11118/actaun201361030743), on page 745.

In many cases it is preferable here too that the values for the breaking force and/or the strain at fracture are by virtue of the PEF treatment in step (b) or in step (b-v) of the present invention increased by more than 5%, particularly preferably by more than 7%, very particularly preferably by more than 10%. A comparison is consequently made here with green coffee beans that, with otherwise identical treatment, have not undergone step (b) (PEF treatment) or step (b-v) (PEF treatment).

The PEF treatment of (optionally presoaked) green coffee beans is preferably carried out sufficiently gently that irreversible pores form in the cell membranes and cell walls of the green coffee beans, but without adverse effect on the roasting behavior of the PEF-treated green coffee beans compared to roasted coffee beans of the same type and batch that had previously undergone the same process steps, but without PEF treatment.

The irreversible pores in the cell membranes and cell walls of the green coffee beans created by the PEF treatment of the green coffee beans can preferably be detected by scanning electron microscopy (SEM), transmission electron microscopy (TEM), cryo-transmission electron microscopy (cryo-TEM) or atomic force microscopy (AFM) or particularly preferably by a combination of said methods.

Preference is given to a process according to the invention (as described above, preferably as referred to above as preferred) wherein the green coffee beans, preferably the presoaked green coffee beans, have after the PEF treatment a smaller number of coliform bacteria than before the PEF treatment, in each case determined in accordance with ISO 4832.

The term "coliform bacteria" refers to lactose-splitting, gram-negative, facultatively anaerobic, rod-shaped bacteria that produce acid and gases; examples of such coliform bacteria are the genera *Citrobacter, Enterobacter, Escherichia*, and *Klebsiella*.

The contamination of green coffee beans (presoaked or non-presoaked) with coliform bacteria is undesirable and the lowest possible contamination of the green coffee beans (presoaked or non-presoaked) with coliform bacteria is therefore preferable.

The process of the invention is preferably carried out in such a way that the number of coliform bacteria on the optionally presoaked green coffee beans is after the PEF treatment smaller than immediately before the PEF treatment, in each case determined on the basis of the number of colony-forming units (CFU) determined in accordance with DIN EN ISO 4833-1.

The number of coliform bacteria on the green coffee beans, preferably the presoaked green coffee beans, after the PEF treatment is preferably below 150 CFU, particularly preferably below 140 CFU, very particularly preferably below 135 CFU, most preferably below 130 CFU, determined in accordance with DIN EN ISO 4833-1.

The invention relates also to a process (as described above, preferably as referred to above as preferred) wherein during the PEF treatment of the green coffee beans in step (b) or of the presoaked green coffee beans in step (b-v)

a pulse field strength of at least 0.2 kV/cm, preferably at least 1.0 kV/cm, particularly preferably at least 1.5 kV/cm, very particularly preferably at least 2.7 kV/cm, most preferably a pulse field strength within a range from 0.5 kV/cm to 3 kV/cm, is applied, and or an actual energy input of at least 5 kJ/L, preferably at least 15.0 kJ/L, takes place, and or the green coffee bean is exposed to at least 5 pulses of the pulsed electric field, preferably at least 10 pulses, particularly preferably at least 18 pulses, very particularly preferably at least 20 pulses, most preferably at least 25 pulses, preferably within a range from 5 to 100 pulses, particularly preferably within a range from 5 to 50 pulses, and or the green coffee beans at least initially (i.e. before the first pulse of the electric field) have a moisture content of at least 10%, preferably at least 20%, particularly preferably at least 30%, very particularly preferably at least 40%, preferably a moisture content within a range from 10 to 50%, particularly preferably within a range from 20 to 45%, determined in accordance with ISO 6673.

The effects and advantages set out hereinabove in connection with processes of the invention and hereinbelow in connection with decaffeinated green coffee beans or decaffeinated roasted coffee beans of the invention or with preparations produced therefrom are in many cases realized particularly advantageously in a process design having the parameters described herein.

More particularly, with a suitable selection of the parameters and system technology specified here, there are particularly advantageous combined effects as described above, especially in respect of a reduction in microorganisms, preferably coliform bacteria, and particularly advantageous extraction properties of the green coffee beans treated in this way.

Particular preference is given to a process of the invention wherein the following parameters that had been described in detail as being preferred are combined with the use of liquid carbon dioxide and/or dichloromethane in the subsequent step (c) "extracting of caffeine from the PEF-treated green coffee beans using an extraction liquid, with the result that decaffeinated, PEF-treated green coffee beans" are obtained, or (c-v) "extracting of caffeine from the PEF-treated, presoaked green coffee beans using an extraction liquid, with the result that decaffeinated, PEF-treated, presoaked green coffee beans" are obtained and or are in the step "drying of the decaffeinated, PEF-treated green coffee beans, preferably decaffeinated, PEF-treated, presoaked green coffee beans, with the result that dried, decaffeinated green coffee beans are obtained, preferably dried, decaffeinated green coffee beans having a predetermined moisture content", combined with a drying process that includes a fluidized-bed drying.

Particular preference is given to a process according to the invention (as described above, preferably as referred to above as preferred) wherein presoaking of green coffee beans with soaking liquid in step (a-v) is accompanied by absorption of at least 10% by weight of soaking liquid, preferably at least 20% by weight, particularly preferably at least 30% by weight, based on the total mass of the green coffee beans before presoaking.

The amount of swelling liquid absorbed is determined by differential weighing, from which the percentage by weight absorbed is calculated.

The effects and advantages set out hereinabove in connection with processes of the invention and hereinbelow in connection with decaffeinated green coffee beans or decaffeinated roasted coffee beans of the invention or with preparations(s(es) produced therefrom are in many cases realized particularly advantageously in a soaking operation having the parameters described herein.

The invention relates also to decaffeinated green coffee beans, decaffeinated roasted coffee beans or preparations produced therefrom that are producible and/or produced by a process according to the invention (as described above, preferably as referred to above as preferred).

The fracture behavior of the decaffeinated green coffee beans of the invention is preferably not made worse, more preferably is in fact improved, compared to decaffeinated coffee beans of the same type and batch that had previously undergone the same process steps, but without PEF treatment; the fracture behavior is in each case determined using the "dynamic loading" method described by Nedomová, Trnka, Stoklasová, and Buchar in the specialist article "Strength of coffee beans under static and dynamic loading", 2013 (doi: 10.11118/actaun201361030743), on page 745.

Decaffeinated green coffee beans (presoaked or non-presoaked) of the invention preferably have irreversible pores in the cell membranes and cell walls of the green coffee beans. The above statements apply accordingly.

The invention relates also to the use of a PEF device (i.e. a device for PEF treatment of articles, especially of foodstuffs) for the PEF treatment of (optionally presoaked) green coffee beans before decaffeination.

With the use according to the invention of the PEF device, the effects and advantages set out hereinabove in connection with processes of the invention and with decaffeinated green coffee beans or decaffeinated roasted coffee beans of the invention or with preparations produced therefrom can be achieved and adjusted according to the requirements in the individual case.

Preference is given to the use according to the invention of a PEF device (as described above, preferably as referred to above as preferred) wherein the PEF treatment is carried out before decaffeination (cf. the process of the invention), and or before and/or after presoaking (preferably after presoaking), and or before and/or after drying, and or before roasting (cf. the inventive process for producing decaffeinated roasted coffee beans)

and or to reduce the microorganism content of the (preferably presoaked) green coffee beans and or to improve the caffeine extractability of the (preferably presoaked) green coffee beans.

The person skilled in the art will, depending on the requirements in the individual case, decide at what point in the process and for what purpose PEF treatment is carried out. In many cases it is preferable to carry out PEF treatment for more than one purpose. In addition, it is in some cases preferable to perform more than one PEF treatment. PEF treatments can be carried out at different points in the process and serve different purposes.

With the use according to the invention of the PEF device, the effects and advantages set out hereinabove in connection with processes of the invention and with decaffeinated green coffee beans or decaffeinated roasted coffee beans of the invention or with preparations produced therefrom can be achieved and adjusted according to the requirements in the individual case.

The invention relates also to a system for decaffeinating green coffee beans in a process according to the invention (as described above, preferably as referred to above as preferred), comprising at least:

a device for the PEF treatment of green coffee beans, a device for decaffeinating the PEF-treated green coffee beans connected downstream thereof (i.e. of the device for PEF treatment).

The device for PEF treatment of green coffee beans is particularly suitable for executing a process of the invention for producing decaffeinated green coffee beans, decaffeinated roasted coffee beans or preparations produced therefrom (as described above, preferably as referred to above as preferred).

With the use according to the invention of the treatment device, the effects and advantages set out hereinabove in connection with processes of the invention, with decaffeinated green coffee beans or decaffeinated roasted coffee beans of the invention or with preparations produced therefrom, and with uses according to the invention, can be achieved and adjusted according to the requirements in the individual case.

Preference is given to an inventive system for decaffeinating green coffee beans in a process according to the invention (as described above, preferably as referred to above as preferred), further comprising:

a device for presoaking green coffee beans connected upstream or downstream (preferably upstream) of the device for PEF treatment and or a device for removing adhering water (as is typically present after PEF treatment) from green coffee beans, preferably comprising a spiral dryer and/or a blower, that is connected downstream of the device for PEF treatment (preferably immediately downstream)

and or a device for the transfer and/or transport of the decaffeinated green coffee produced and or a device for drying the decaffeinated green coffee produced.

Depending on the requirements in the individual case, particular preference is given to one, two or more, or all of the devices defined herein for particularly advantageous execution of the process of the invention. The person skilled in the art will him/herself select the respectively preferred device(s) or respectively preferred combinations of devices based on what is known in the individual case.

The system of the invention preferably comprises a computerized unit for the control and regulation of the automated PEF treatment and decaffeination of the green coffee beans.

With the use according to the invention of the PEF device, the effects and advantages set out hereinabove in connection with processes of the invention, with decaffeinated green coffee beans or decaffeinated roasted coffee beans of the invention or with preparations produced therefrom, and with uses according to the invention, can be achieved and adjusted according to the requirements in the individual case.

Particular preference is given to a process for producing decaffeinated green coffee beans, decaffeinated roasted coffee beans or preparations produced therefrom (as described above, preferably as referred to above as preferred) having the following features:

(a) presoaking of green coffee beans with swelling liquid, with the result that presoaked green coffee beans are obtained, (b) subjecting the presoaked green coffee beans to PEF treatment, with the result that PEF-treated, presoaked green coffee beans are obtained, (c) extracting of caffeine from the PEF-treated, presoaked green coffee beans using an extraction liquid, with the result that decaffeinated, PEF-treated, presoaked green coffee beans are obtained, (d) drying of the decaffeinated, PEF-treated, presoaked green coffee beans, with the result that dried decaffeinated green coffee beans are obtained, wherein the drying of the decaffeinated, PEF-treated, presoaked green coffee beans is carried out by means of a process selected from the group consisting of:

fluidized-bed processes, vacuum-drying processes, vibration drying, freeze drying, hot-air drying, microwave drying, infrared drying, and combinations thereof, and that is preferably selected from the group consisting of:

fluidized bed processes, vacuum drying processes, and combinations thereof, wherein the drying process preferably comprises at least fluidized-bed drying, particularly preferably in combination with vacuum drying, and wherein the vacuum drying is very particularly preferably carried out first, followed by the fluidized-bed drying.

Particular preference is given to a process for producing decaffeinated green coffee beans, decaffeinated roasted coffee beans or preparations produced therefrom (as described above, preferably as referred to above as preferred) having the following features:

(a) presoaking of green coffee beans with swelling liquid, with the result that presoaked green coffee beans are obtained, (b) subjecting the presoaked green coffee beans to PEF treatment, with the result that PEF-treated, presoaked green coffee beans are obtained, (c) extracting of caffeine from the PEF-treated, presoaked green coffee beans using an extraction liquid, with the result that decaffeinated, PEF-treated, presoaked green coffee beans are obtained, (d) drying of the decaffeinated, PEF-treated, presoaked green coffee beans, with the result that dried decaffeinated green coffee beans are obtained, wherein the swelling liquid is an aqueous swelling liquid and or the extraction liquid is selected from the group consisting of:

liquid carbon dioxide, supercritical carbon dioxide, dichloromethane, dichloroethane, ethanol, trichloromethane, trichloroethane, acetone, ethyl acetate, methyl acetate, methanol, coffee oil, and water, preferably selected from the group consisting of:

water, ethyl acetate, liquid carbon dioxide, supercritical carbon dioxide, and dichloromethane particularly preferably selected from the group consisting of:

liquid carbon dioxide and dichloromethane, very particularly preferably the extraction liquid is liquid carbon dioxide;

it being preferable here that the drying of the decaffeinated, PEF-treated, presoaked green coffee beans is carried out by means of a process selected from the group consisting of:

fluidized-bed processes, vacuum-drying processes, vibration drying, freeze drying, hot-air drying, microwave drying, infrared drying, and combinations thereof, and that is particularly preferably selected from the group consisting of:
  fluidized bed processes, vacuum drying processes, and combinations thereof,
wherein the drying process preferably comprises at least fluidized-bed drying, particularly preferably in combination with vacuum drying,
and
wherein the vacuum drying is very particularly preferably carried out first, followed by the fluidized-bed drying.

FIGURES

The invention is elucidated in more detail hereinbelow with reference to figures.

FIG. 1 shows a flow chart of a first embodiment of a process according to the invention 100 for decaffeinating green coffee beans 101 that results in decaffeinated, PEF-treated, presoaked green coffee beans 107 being obtained. The process according to the invention for decaffeinating green coffee beans is preferably carried out in an inventive system for decaffeinating green coffee beans (as described above, preferably as referred to above as preferred).

In a first step 102 of the process 100, the employed green coffee beans 101 are presoaked with swelling liquid, with the result that presoaked green coffee beans 103 are obtained. In the process according to the invention, it is particularly advantageous when the presoaking of the employed green coffee beans with soaking liquid takes place in an inventive system in which a device for presoaking green coffee beans (as described above, preferably as referred to above as preferred) is connected upstream of the device for PEF treatment.

In a second step 104 of the process 100, the presoaked green coffee beans 103 thus obtained are subjected to PEF treatment, with the result that PEF-treated, presoaked green coffee beans 105 are obtained. In the process according to the invention, it is particularly advantageous when the PEF treatment of the employed green coffee beans takes place in an inventive system that includes a device for the PEF treatment of green coffee beans (as described above, preferably as referred to above as preferred).

In a further step 106 of the process 100, the caffeine is extracted from the PEF-treated, presoaked green coffee beans 105, with the result that decaffeinated, PEF-treated, presoaked green coffee beans 107 are obtained. In the process according to the invention, it is particularly advantageous when the extraction of caffeine (decaffeination) takes place in an inventive system that includes a device for the PEF treatment of green coffee beans and, connected downstream thereof, a device for decaffeinating the PEF-treated green coffee beans (as described above, preferably as referred to above as preferred).

Figure 2:
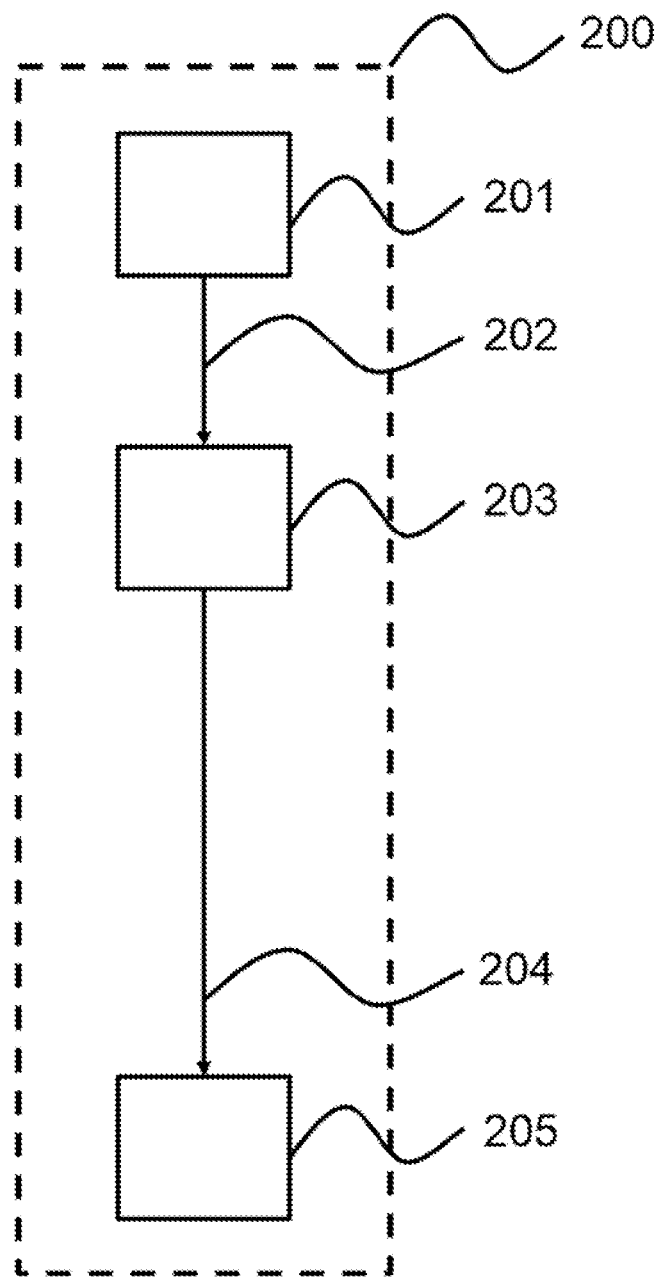

FIG. 2 shows a schematic flow diagram of a process for decaffeinating green coffee beans without PEF treatment. The employed green coffee beans 201 are in a first step of the process 200 presoaked with swelling liquid 202, with the result that presoaked green coffee beans 203 are obtained.

In a next step of the process 200, the caffeine is then extracted from the presoaked green coffee beans 106, with the result that decaffeinated, presoaked green coffee beans 107 are obtained. PEF treatment does not take place in this noninventive comparative example.

Figure 3:
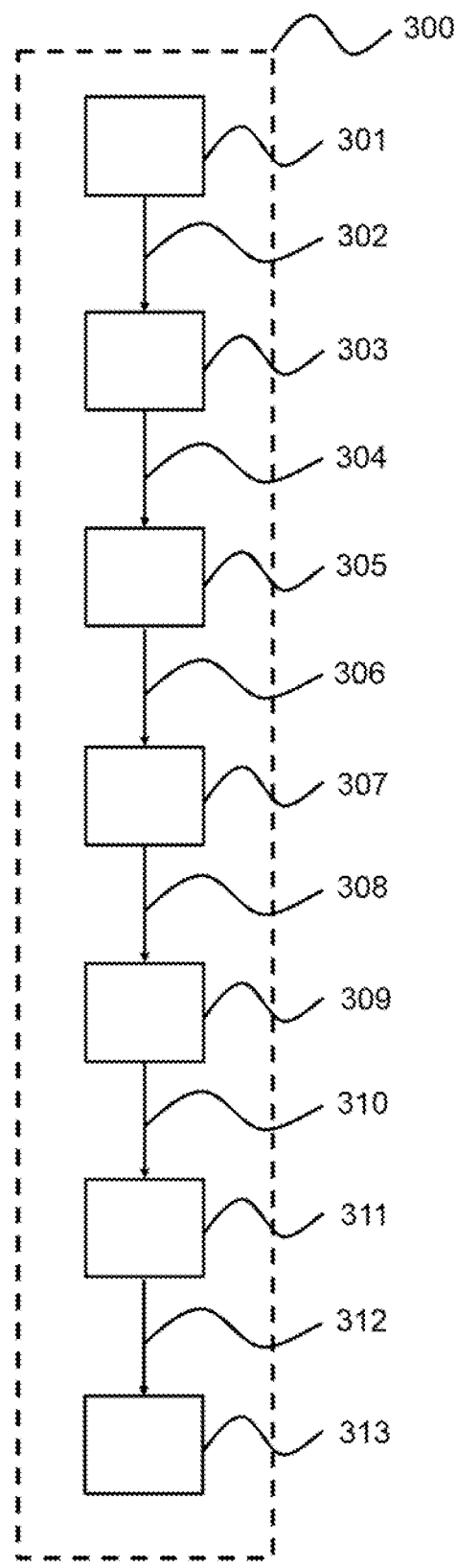

FIG. 3 shows a flow diagram of a further embodiment of a process according to the invention 300 for decaffeinating green coffee beans. This process according to the invention for decaffeinating green coffee beans is particularly advantageously carried out in an inventive system for decaffeinating green coffee beans (as described above, preferably as referred to above as preferred).

Green coffee beans having a moisture content of approx. 8-12% 301 are presoaked with aqueous swelling liquid 302 to a moisture content of 45%, with the result that presoaked green coffee beans 303 are obtained. It is particularly advantageous when the presoaking of the employed green coffee beans having a moisture content of approx. 8-12% with aqueous soaking liquid to a moisture content of 45% takes place here in an inventive system wherein a device for presoaking green coffee beans (as described above, preferably as referred to above as preferred) is connected upstream of the device for PEF treatment.

In a next step 304 of the process 300, the PEF treatment of the presoaked green coffee beans takes place, with the result that PEF-treated, presoaked green coffee beans having adhering water 305 are obtained. It is particularly advantageous when the PEF treatment of the employed green coffee beans takes place here in an inventive system that includes a device for the PEF treatment of green coffee beans (as described above, preferably as referred to above as preferred). In a next step 306 of the process 300, the adhering water is removed by means of a spiral dryer and a blower, with the result that PEF-treated, presoaked green coffee beans 307 are obtained. It is particularly advantageous when the removal of the adhering water from the PEF-treated green coffee beans takes place here in an inventive system wherein connected downstream of the device for PEF treatment there is a device (as described above, preferably as referred to above as preferred) for removing adhering water from green coffee beans, comprising a spiral dryer and a blower.

In a next step 308 of the process 300, the caffeine is extracted from the PEF-treated, presoaked green coffee beans using liquid $CO_2$, with the result that decaffeinated, PEF-treated, presoaked green coffee beans 309 are obtained. It is particularly advantageous when the extraction of caffeine (decaffeination) takes place here in an inventive system that includes a device for decaffeinating the PEF-treated green coffee beans (as described above, preferably as referred to above as preferred).

In a further step 310 of the process 300, the decaffeinated, PEF-treated, presoaked green coffee beans undergo vacuum drying to a moisture content of 20-25%, with the result that decaffeinated, PEF-treated, presoaked green coffee beans 311 are obtained. It is particularly advantageous when the vacuum drying takes place here in an inventive system that includes a device for (vacuum) drying the decaffeinated green coffee that has been produced.

In a next step 312 of the process 300, the decaffeinated, PEF-treated, presoaked green coffee beans undergo fluidized-bed drying to a residual moisture content of 9-13%, with the result that dried, decaffeinated, green coffee beans 313 are obtained. It is particularly advantageous when the fluidized-bed drying takes place here in an inventive system that includes a device for drying the decaffeinated green coffee that has been produced.

Figure 4:
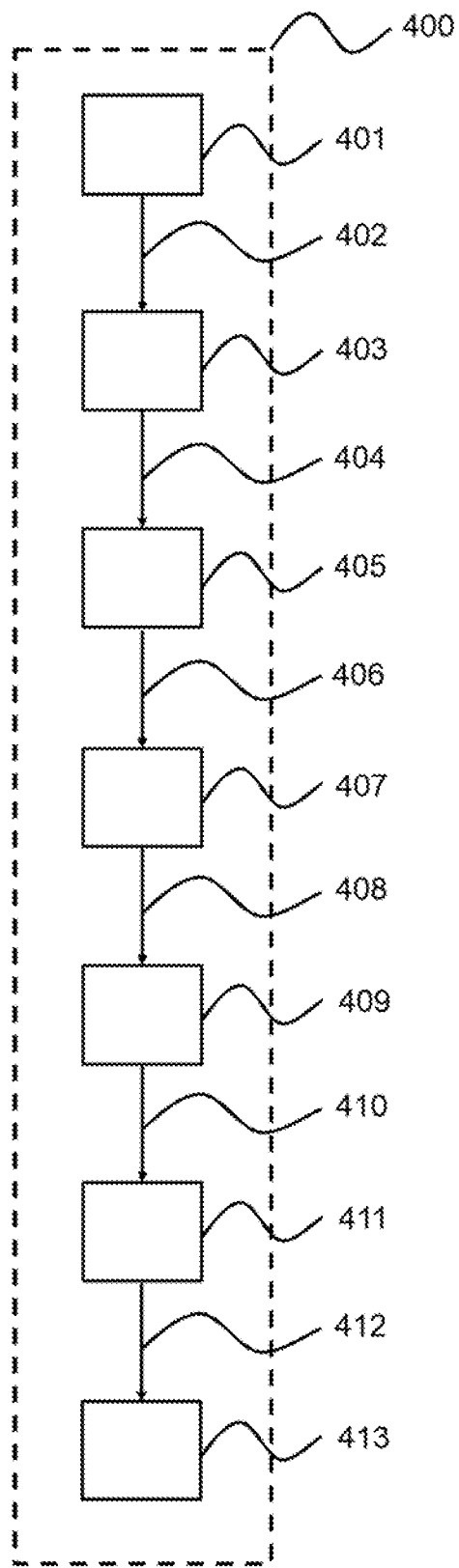

FIG. 4 shows a flow diagram of a process for decaffeinating green coffee beans without the use of PEF treatment (noninventive).

In a first step 402 of the process 400, green coffee having a moisture content of 8-12% 401 undergoes presoaking with a swelling liquid to a moisture content of approx. 45%, with the result that presoaked green coffee beans 403 are obtained.

In a further step 404 of the process 400, the presoaked green coffee beans 403 pass through a switched off PEF apparatus, with the result that PEF treatment does not take place and presoaked green coffee beans having adhering water 405 are obtained.

In a further step 406 of the process 400, the water adhering to the presoaked green coffee beans having adhering water is removed by means of a spiral dryer and a blower, with the result that presoaked green coffee beans 407 are obtained.

In a further step 408 of the process 400, the caffeine is extracted from the presoaked green coffee beans using liquid $CO_2$, with the result that decaffeinated, presoaked green coffee beans 409 are obtained.

In a further step 410 of the process 400, the decaffeinated, presoaked green coffee beans undergo vacuum drying to a residual moisture content of 20-25%, with the result that decaffeinated, presoaked green coffee beans 411 are obtained.

In a further step 412 of the process 400, the decaffeinated, presoaked green coffee beans undergo fluidized-bed drying to a residual moisture content of 9-13%, with the result that dried, decaffeinated, green coffee beans 413 are obtained.

Figure 5:
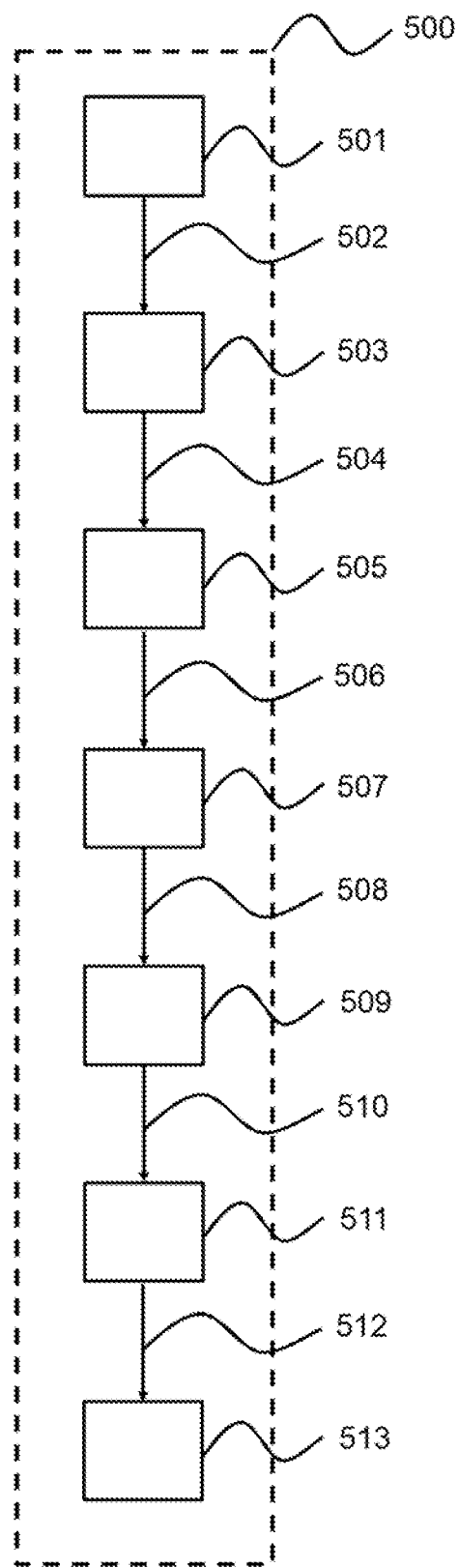

FIG. 5 shows a flow diagram of a further embodiment of a process according to the invention 500 for producing dried, decaffeinated green coffee beans 513.

In a first step 502 of the process 500, green coffee having a moisture content of 8-12% 501 is hydrated and presoaked in a glass reactor using 150-250 g of steam per 500 g of coffee, with the result that presoaked green coffee beans 503 are obtained.

In a further step 504 of the process 500, the presoaked green coffee beans 503 are subjected to PEF treatment, with the result that PEF-treated, presoaked green coffee beans having adhering water 505 are obtained.

In a further step 506 of the process 500, the water adhering to the PEF-treated, presoaked green coffee beans having adhering water is removed by means of a spiral dryer and a blower, with the result that PEF-treated, presoaked green coffee beans 507 are obtained.

In a further step 508 of the process 500, caffeine is extracted from the PEF-treated, presoaked green coffee beans with dichloromethane in a Soxhlet apparatus, with the result that decaffeinated, PEF-treated, presoaked green coffee beans 509 are obtained.

In a further step 510 of the process 500, the decaffeinated, PEF-treated, presoaked green coffee beans are dried in a hot-air sample dryer to a moisture content of 20-25%, with the result that decaffeinated, PEF-treated, presoaked green coffee beans 511 are obtained.

In a further step 512 of the process 500, decaffeinated, PEF-treated, presoaked green coffee beans are dried in a fluidized-bed dryer to a moisture content of 9-12%, with the result that dried, decaffeinated, green coffee beans 513 are obtained.

Figure 6:
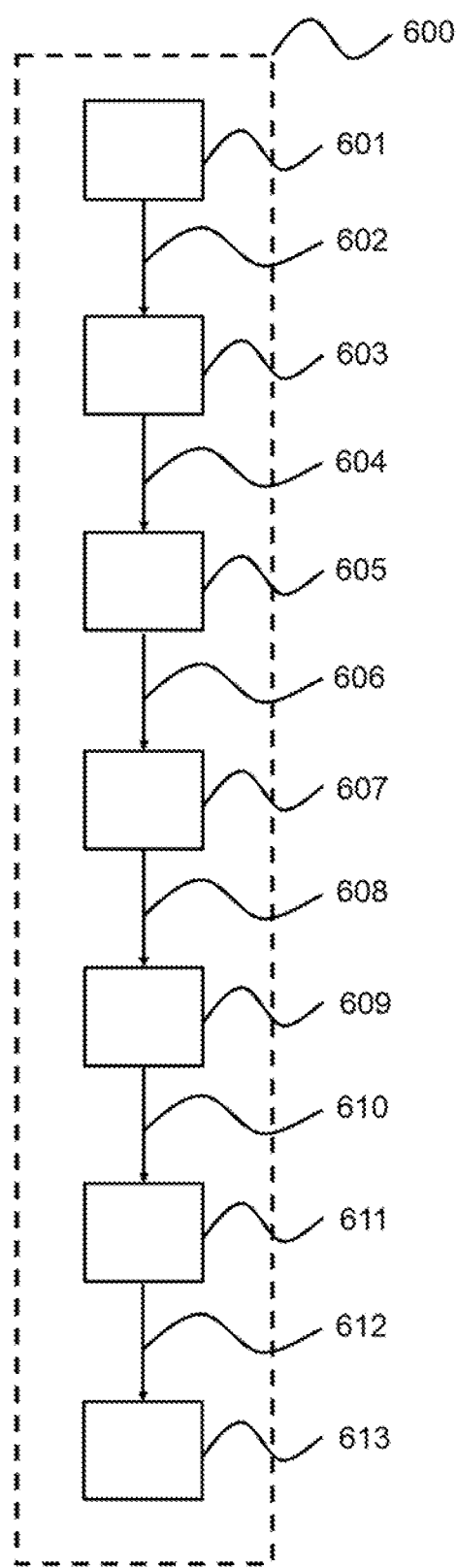

FIG. 6 shows a flow diagram of an alternative process 600 for producing dried, decaffeinated green coffee beans 613 without PEF treatment.

In a first step 602 of the process 600, green coffee having a moisture content of 8-12% 601 is hydrated and presoaked in a glass reactor using 150 g of steam per 500 g of coffee, with the result that presoaked green coffee beans 603 are obtained.

In a further step 604 of the process 600, the presoaked green coffee beans 603 pass through a switched off PEF apparatus, with the result that PEF treatment does not take place and presoaked green coffee beans having adhering water 605 are obtained.

In a further step 606 of the process 600, the water adhering to the presoaked green coffee beans having adhering water is removed by means of a spiral dryer and a blower, with the result that presoaked green coffee beans 607 are obtained.

In a further step 608 of the process 600, caffeine is extracted from the presoaked green coffee beans with dichloromethane in a Soxhlet apparatus, with the result that decaffeinated, presoaked green coffee beans 609 are obtained.

In a further step 610 of the process 600, the decaffeinated, presoaked green coffee beans are vacuum dried to a moisture content of 20-25%, with the result that decaffeinated, presoaked green coffee beans 611 are obtained.

In a further step 612 of the process 600, decaffeinated, presoaked green coffee beans are dried in a fluidized-bed dryer to a moisture content of 9-12%, with the result that dried, decaffeinated, green coffee beans 613 are obtained.

Figure 7:
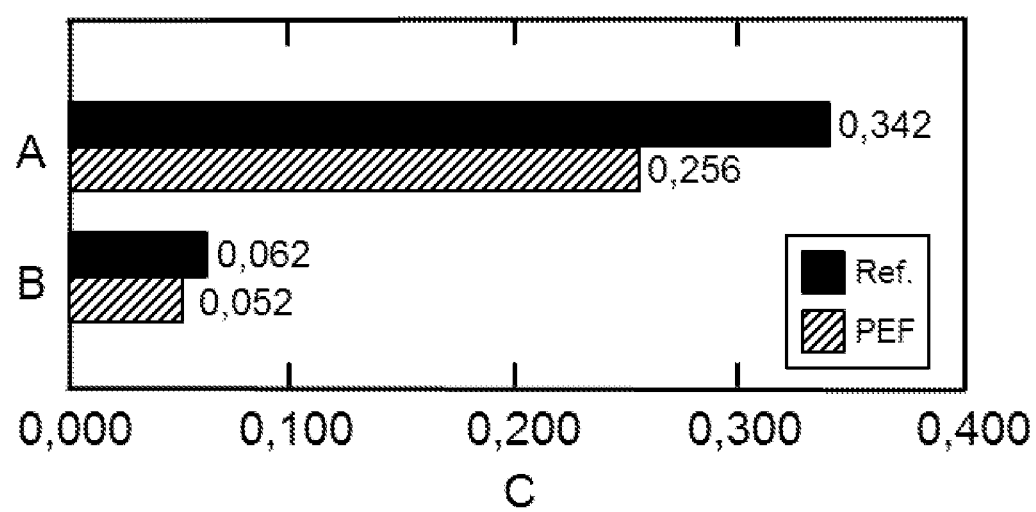

The invention is elucidated in more detail hereinbelow with reference to examples referring to further figures:

FIG. 7 shows example results for the decaffeination of presoaked, PEF-treated and non-PEF-treated raw green coffee beans with liquid carbon dioxide in production. The letter "A" denotes the results for green coffee beans of the "Arabica" type. The letter "B" denotes results for green coffee beans of the "Robusta" type. The x-axis, labeled "C", shows the caffeine content in % by weight based on the dry matter of the green coffee beans (caffeine content in DM) after decaffeination. The solid black bars represent measured values determined on reference samples (without PEF treatment) (abbreviated to "Ref." here and in other related figures). The hatched bars represent measured values determined on PEF-treated samples (abbreviated to "Ref." here and in other related figures).

Figure 8:
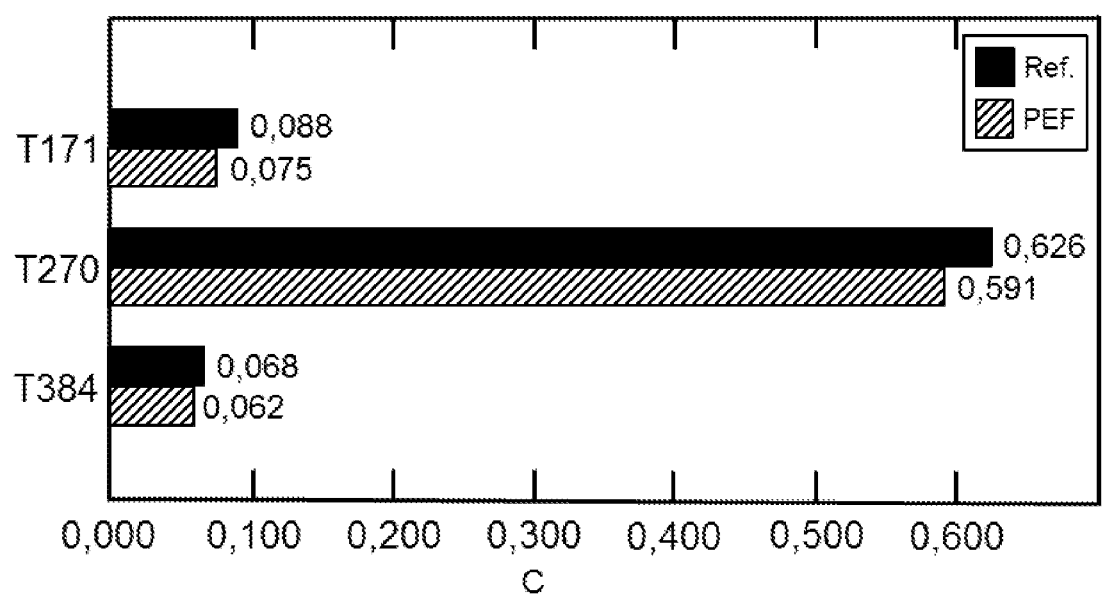

FIG. 8 shows example results for the decaffeination of various batches of presoaked, PEF-treated (PEF-treated sample) and non-PEF-treated (reference sample) raw green coffee beans with liquid $CO_2$ in production. The designations "T171", "T270", and "T384" stand for the respective production batch from which the samples investigated in each case were taken and with which they were respectively decaffeinated together. The x-axis, labeled "C", shows the caffeine content in % by weight based on the dry matter of the green coffee beans (caffeine content in DM) after decaffeination. The solid black bars represent measured values determined on reference samples (without PEF treatment). The hatched bars represent measured values determined on PEF-treated samples.

Figure 9:
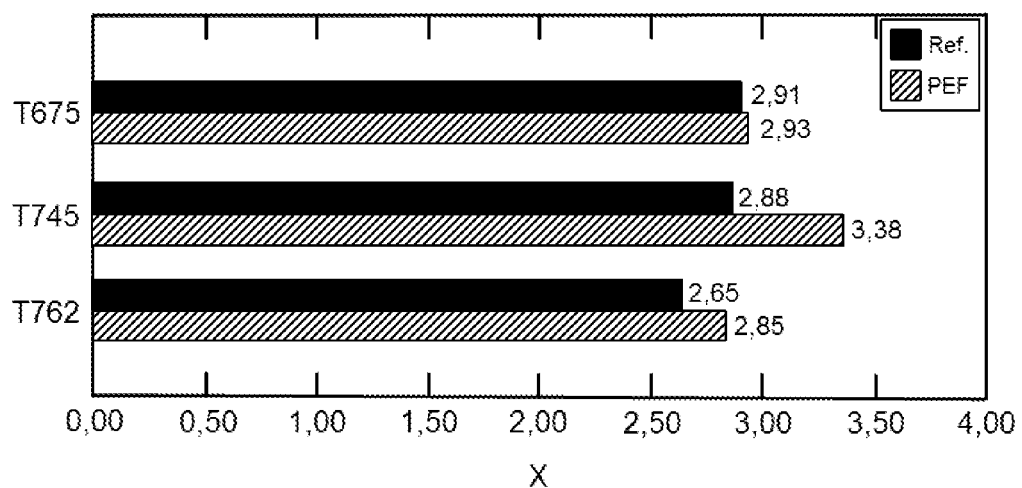

FIG. 9 shows example results for the drying rates of various batches of presoaked, PEF-treated (PEF-treated sample) and non-PEF-treated (reference sample) raw green coffee beans in a vacuum dryer. The designations "T675", "T745", and "T762" stand for the respective production batch from which the samples investigated in each case were taken and with which they were respectively decaffeinated together. The x-axis, labeled "X", shows the drying rate in kilograms/minute (kg/min). The solid black bars represent measured values determined on reference samples (without PEF treatment). The hatched bars represent measured values determined on PEF-treated samples.

Figure 10:
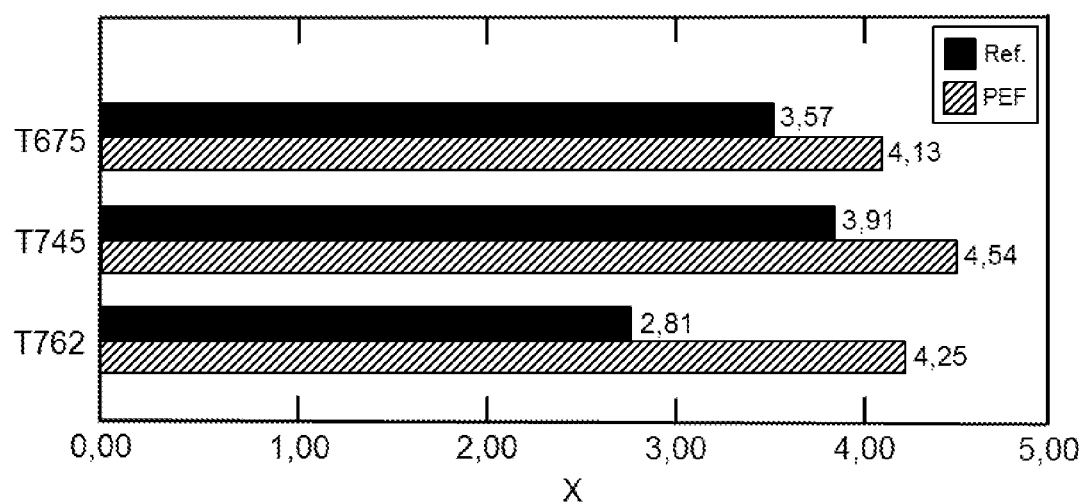

FIG. 10 shows example results for the drying rates of various batches of presoaked, PEF-treated (PEF-treated sample) and non-PEF-treated (reference sample) raw green coffee beans in a fluidized-bed dryer. The designations "T675", "T745", and "T762" stand for the respective production batch from which the samples investigated in each case were taken and with which they were respectively decaffeinated together. The x-axis, labeled "X", shows the drying rate in kilograms/minute (kg/min). The solid black bars represent measured values determined on reference samples (without PEF treatment). The hatched bars represent measured values determined on PEF-treated samples.

Figure 11A:
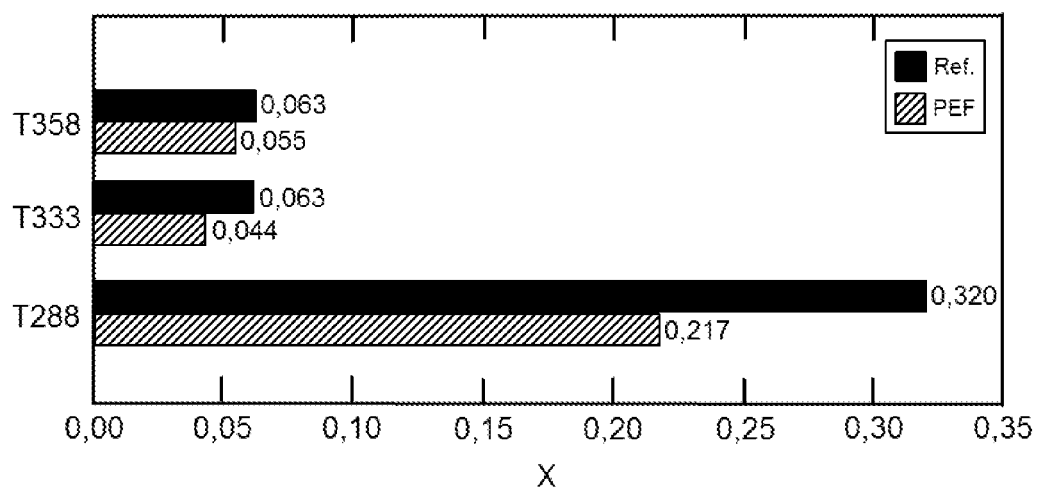

FIG. 11a shows example results for the decaffeination of various batches of presoaked, PEF-treated (PEF-treated sample) and non-PEF-treated (reference sample) raw green coffee beans with liquid $CO_2$. The designations "T358", "T333", and "T288" stand for the respective production batch from which the samples investigated in each case were taken and with which they were respectively decaffeinated together. The x-axis, labeled "X", shows here and in FIG. 11b the caffeine content in % by weight based on the dry matter of the green coffee beans (caffeine content in DM) after decaffeination. The solid black bars represent here and in FIG. 11b measured values determined on reference samples (without PEF treatment). The hatched bars represent here and in FIG. 11b measured values determined on PEF-treated samples.

Figure 11B:
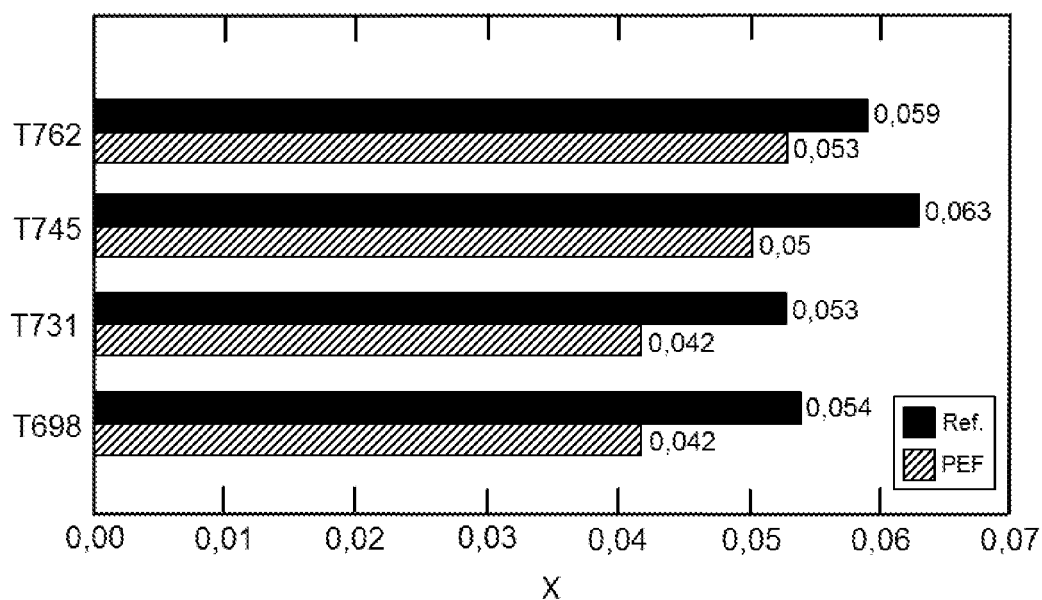

FIG. 11b shows example results for the decaffeination of various batches of presoaked, PEF-treated (PEF-treated sample) and non-PEF-treated (reference sample) raw green coffee beans with liquid $CO_2$. The designations "T762", "T745", "T731", and "T698" stand for the respective production batch from which the samples investigated in each case were taken and with which they were respectively decaffeinated together.

Figure 12A:
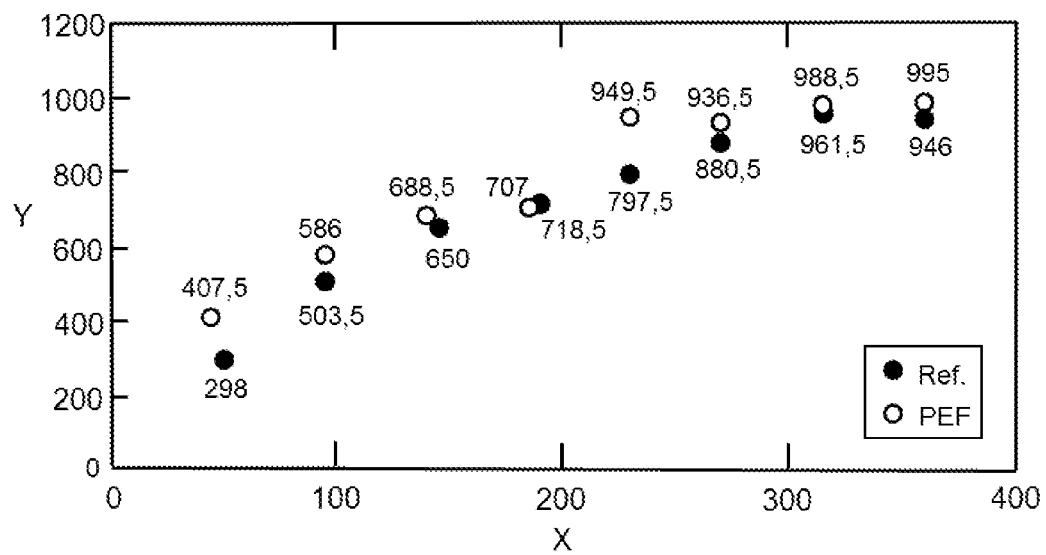
Figure 12B:
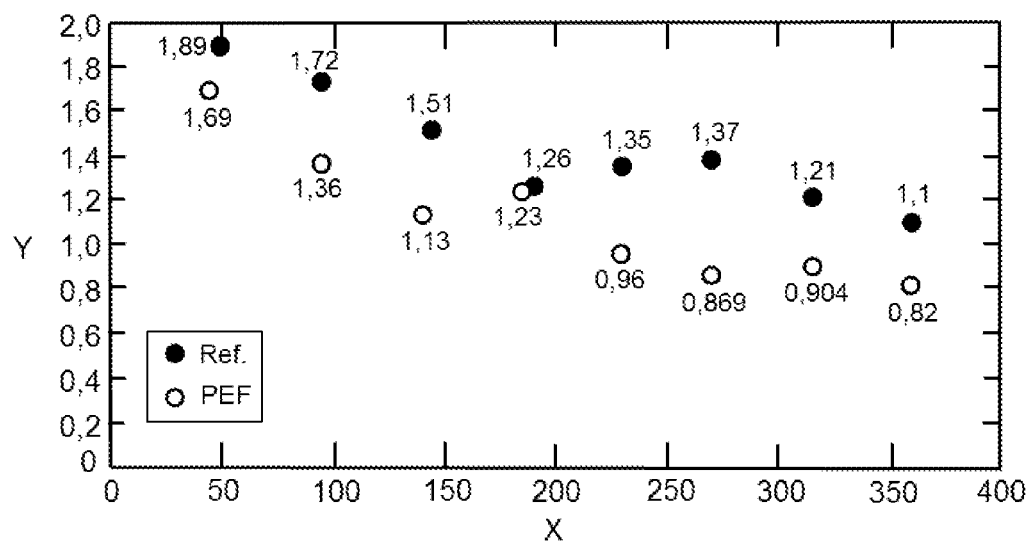

FIG. 12a shows example results for the decaffeination of a batch of presoaked, PEF-treated (PEF-treated sample) and non-PEF-treated (reference sample) raw green coffee beans in a Soxhlet apparatus, at 70° C., with dichloromethane as extractant. The y-axis, labeled "Y," shows the caffeine concentration in the extract in milligrams/liter (mg/L). The x-axis, labeled "X" indicates here and in FIG. 12b the extraction time in minutes (min). The solid black dots here and in FIG. 12b represent measured values determined on reference samples (without PEF treatment). The solid white circles here and in FIG. 12b represent measured values determined on PEF-treated samples.

FIG. 12b shows example results for the decaffeination of a batch of presoaked, PEF-treated (PEF-treated sample) and non-PEF-treated (reference sample) raw green coffee beans in a Soxhlet apparatus, at 70° C., with dichloromethane as extractant. The y-axis, labeled "Y", shows—in contrast to FIG. 12a—the caffeine content in the green coffee beans in % by weight based on the dry matter of the green coffee beans (caffeine content in DM).

Figure 13:
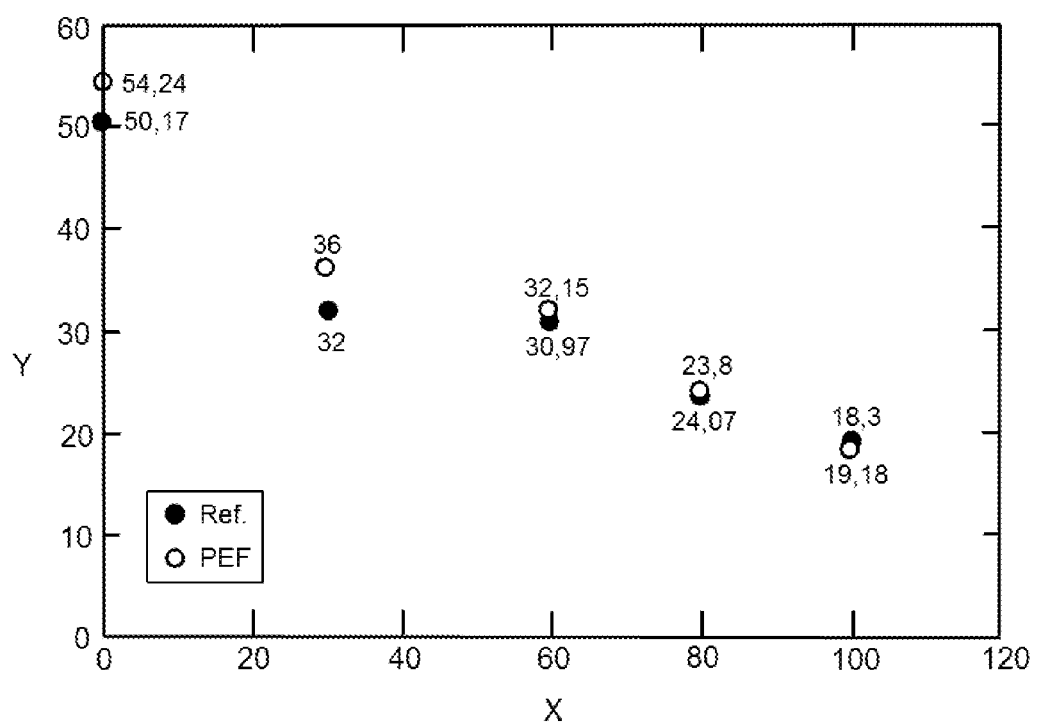

FIG. 13 shows by way of example the course of drying a batch (T171) of decaffeinated, presoaked, PEF-treated (PEF-treated sample) and non-PEF-treated (reference sample) raw green coffee beans in a drum dryer. The y-axis, labeled "Y", shows the moisture content of the decaffeinated, presoaked, PEF-treated or non-PEF-treated green coffee beans in % by weight based on g water per 100 g of green coffee beans (w/w). The x-axis, labeled "X", shows the drying time in minutes (min). The solid black dots represent measured values determined on reference samples (without PEF treatment). The solid white circles represent measured values determined on PEF-treated samples.

Figure 14A:
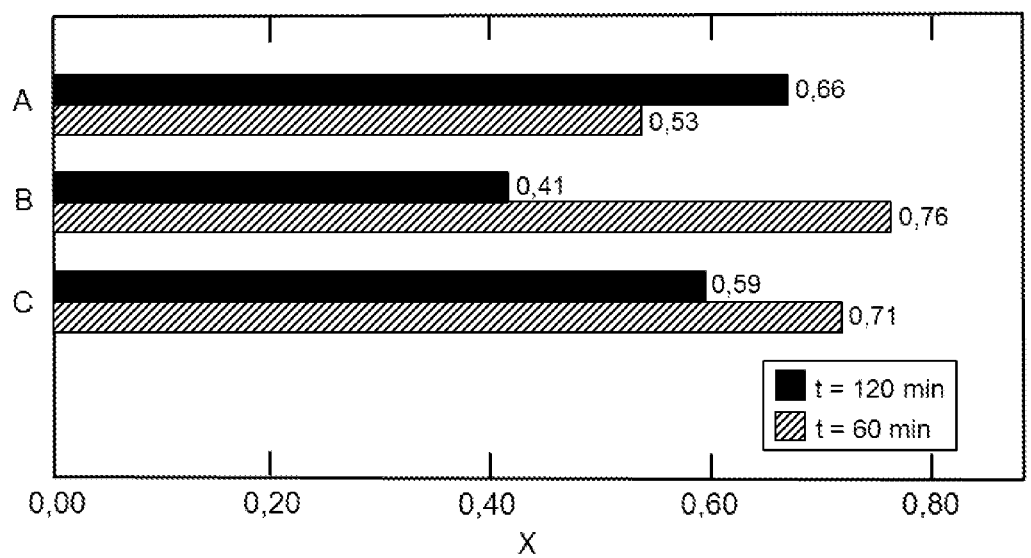

FIG. 14a shows example results for the decaffeination in a Soxhlet apparatus, at 70° C., with dichloromethane as extractant of fractions of a batch of presoaked raw green coffee beans PEF-treated at varying specific energy (kJ/kg) depending on the particular fraction (PEF-treated sample). The investigations were carried out on fractions of a batch of green coffee beans of the "Arabica" type. The letter "A" denotes here and in FIG. 14b the results for a fraction subjected to PEF treatment at a specific energy of 22 kJ/kg. The letter "B" denotes here and in FIG. 14b the results for a fraction subjected to PEF treatment at a specific energy of 10 kJ/kg. The letter "C" denotes here and in FIG. 14b the results for a fraction subjected to PEF treatment at a specific energy of 5 kJ/kg. The x-axis, labeled "X", shows here and in FIG. 14b the caffeine content in % by weight based on the dry matter of the green coffee beans (caffeine content in DM) after decaffeination. The solid black bars represent here and in FIG. 14b measured values determined after an extraction time of 120 minutes (abbreviated here and in FIG. 14b to "t=120 min"). The hatched bars represent here and in FIG. 14b measured values determined after an extraction time of 60 minutes (abbreviated here and in FIG. 14b to "t=60 min").

Figure 14B:
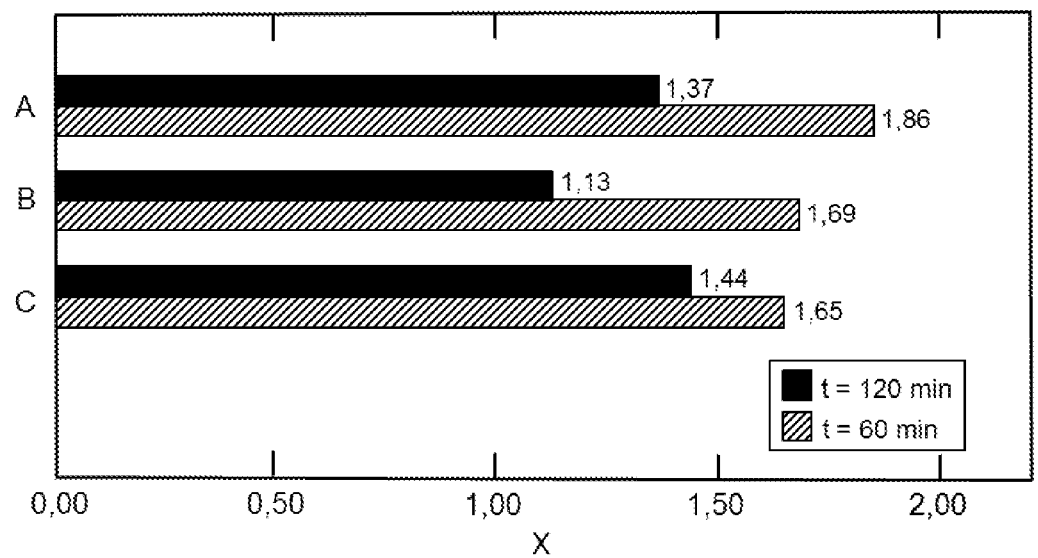

FIG. 14b shows example results for the decaffeination in a Soxhlet apparatus, at 70° C., with dichloromethane as extractant of fractions of a batch of presoaked raw green coffee beans PEF-treated at varying specific energy (kJ/kg) depending on the particular fraction (PEF-treated sample). The investigations were carried out on fractions of a batch of green coffee beans of the "Robusta" type.

EXAMPLES

Example 1: Decaffeination of Test Coffee With Liquid Carbon Dioxide in Production The selection of substances in this example is exemplary only and different coffee beans, different soaking liquid, and different extractants may mutatis mutandis also be used by the person skilled in the art.

Raw green coffee beans of the "Robusta" and "Arabica" test coffees shown in Table 1 were used by way of example.

TABLE 1

| | Sample material—Raw green coffee beans | | |
| --- | --- | --- | --- |
| | B | C | D |
| | Moisture content | Caffeine | Caffeine (in DM) |
| A | [% by weight] | [% by weight] | [% by weight] |
| Robusta | 11.8 | 2.18 | 2.48 |
| Arabica | 10.7 | 1.11 | 1.24 |

The moisture content of the raw green coffee beans was determined in accordance with ISO 6673; corresponding percent values refer to g/100 g green coffee beans (w/w). The caffeine content of the raw green coffee beans was determined in accordance with ISO 20481; corresponding percent values relate to g/100 g green coffee beans. The caffeine content in the dry matter (in DM, column D) of the raw green coffee beans was calculated from the moisture content and the caffeine content; corresponding percent values refer to g/100 g dry matter of the green coffee beans (w/w).

The green coffee beans used were hydrated with direct steam (150 g direct steam to 500 g coffee) until presoaked green coffee beans having a moisture content (coffee moisture content) of about 32% were present.

Half of the green coffee beans presoaked in this way were placed in the PEF treatment cell, which was filled with water and stirred with a spoon to degas it. The mixture of water and green coffee beans was subjected to PEF treatment carried out using the parameters shown in Table 2. The other half of the green coffee beans presoaked as described above were processed further without PEF treatment as a reference sample, by exposing them to a corresponding amount of water for a period corresponding to the PEF treatment time (but without PEF treatment).

TABLE 2

Parameters for PEF treatment

| Pulse | Voltage [kV] | Field strength [kV/cm] | Mass (green coffee beans) [g] | Mass (water) [g] | Mass (in cell) [g] | Energy [J] per pulse | Energy [J/kg] per pulse | Specific energy [kJ/kg] |
|---|---|---|---|---|---|---|---|---|
| 1 | 20 | 30.0 | 3.00 | 400.00 | 432.00 | 832.00 | 450 | 538.92 | 10.817 |
| 2 | 20 | 30.0 | 3.00 | 400.00 | 417.00 | 817.00 | 450 | 550.80 | 11.016 |

The resulting PEF-treated, presoaked green coffee beans were decaffeinated in sample cages on the existing production line using liquid $CO_2$ as extractant. The non-PEF-treated, presoaked green coffee beans were likewise decaffeinated in sample cages on the existing production line using liquid $CO_2$ as extractant as a reference sample under identical conditions.

After decaffeination had been carried out, the PEF-treated, presoaked green coffee beans and the non-PEF-treated, presoaked green coffee beans serving as a reference sample were taken out of the sample cages and dried in the laboratory in drying trays in the ambient air with regular turning to a moisture content of 11±1%. The moisture content was determined in accordance with ISO 6673. The caffeine content was then determined in accordance with ISO 20481.

After decaffeination, the decaffeinated, PEF-treated, presoaked Robusta green coffee beans had a residual caffeine content that was 25.1% below the residual caffeine content of the non-PEF-treated, presoaked Robusta green coffee beans (cf. information for Robusta in Table 3 and FIG. 7).

After decaffeination, the decaffeinated, PEF-treated, presoaked Arabica green coffee beans had a residual caffeine content that was 16.6% below the residual caffeine content of the non-PEF-treated, presoaked Arabica green coffee beans (cf. information for Arabica in Table 3 and FIG. 7).

Results of the experiments from example 1 are summarized in Table 3 and shown in graph form in FIG. 7.

TABLE 3

Selected batches of green coffee beans

| | PEF | | | Reference | | | Difference | |
|---|---|---|---|---|---|---|---|---|
| | Moisture content [% by weight] | Caffeine [% by weight] | Caffeine in DM [% by weight] | Moisture content [% by weight] | Caffeine [% by weight] | Caffeine in DM [% by weight] | Caffeine difference (Reference − PEF) [% by weight] | Caffeine difference relative [%] |
| Robusta | 11.2 | 0.2273 | 0.256 | 11.0 | 0.304 | 0.342 | 0.086 | 25.1 |
| Arabica | 11.6 | 0.0458 | 0.052 | 11.1 | 0.055 | 0.062 | 0.010 | 16.1 |

Example 2: PEF Treatments and Decaffeination With Liquid $CO_2$

The selection of substances in this example is exemplary only and different coffee beans, different soaking liquid, and different extractants may mutatis mutandis also be used by the person skilled in the art.

The batches of green coffee beans described in more detail in Table 4 were selected by way of example.

TABLE 4

Selected batches of green coffee beans

| No. | Batch | Robusta content [% by weight] | Caffeine [% by weight] | Moisture content [% by weight] |
|---|---|---|---|---|
| 1 | T171 | 15 | 1.299 | 11.4 |
| 2 | T270 | 100 | 1.99 | 11.1 |
| 3 | T384 | 0 | 1.115 | 10.3 |

From the production process for decaffeinating green coffee with liquid $CO_2$, 6 samples of 400 g to 500 g each of each of the selected batches of green coffee beans were taken directly after hydration (i.e. after presoaking) with an aqueous swelling liquid and each subjected to PEF treatment as individual samples. In addition, corresponding reference samples were taken, which were processed further without PEF treatment.

The parameters used for PEF treatment are summarized in Table 5.

For each of the selected batches, 2 sample cages were each filled with 3 of the 6 collected samples of 400 g or 500 g, so that each sample cage contained 1200 g to 1300 g of green coffee.

For decaffeination, the sample cages containing the PEF-treated, presoaked green coffee beans and the sample cages containing the reference samples (non-PEF-treated, presoaked green coffee beans) were transferred to the same $CO_2$ decaffeination system (production system), where they were decaffeinated with liquid $CO_2$ together with the respective production batch (from which they had previously been taken).

TABLE 5

PEF parameters

| Batch | Pulse | Voltage [kV] | Field strength [kV/cm] | Mass (coffee) [g] | Mass (water) [g] | Mass (in cell) [g] | Energy [J/pulse] | Energy [(J/kg)/pulse] | Specific energy [kJ/kg] | Sample cage number |
|---|---|---|---|---|---|---|---|---|---|---|
| T171 | 20 | 30.0 | 3.00 | 400.00 | 435.00 | 835.00 | 450 | 538.92 | 10.778 | 3 |
| T171 | 20 | 30.0 | 3.00 | 400.00 | 417.00 | 817.00 | 450 | 550.80 | 11.016 | 3 |
| T171 | 20 | 30.0 | 3.00 | 400.00 | 423.00 | 823.00 | 450 | 546.78 | 10.936 | 2 |
| T171 | 20 | 30.0 | 3.00 | 400.00 | 422.00 | 822.00 | 450 | 547.45 | 10.949 | 2 |
| T171 | 20 | 30.0 | 3.00 | 500.00 | 393.00 | 893.00 | 450 | 503.92 | 10.078 | 3 |
| T171 | 20 | 30.0 | 3.00 | 500.00 | 400.00 | 900.00 | 450 | 500.00 | 10.000 | 2 |
| T270 | 20 | 30.0 | 3.00 | 400.00 | 423.00 | 823.00 | 450 | 546.78 | 10.936 | 0 |
| T270 | 20 | 30.0 | 3.00 | 400.00 | 421.00 | 821.00 | 450 | 548.11 | 10.962 | 0 |
| T270 | 20 | 30.0 | 3.00 | 400.00 | 416.00 | 816.00 | 450 | 551.47 | 11.029 | 4 |
| T270 | 20 | 30.0 | 3.00 | 400.00 | 431.00 | 831.00 | 450 | 541.52 | 10.830 | 4 |
| T270 | 20 | 30.0 | 3.00 | 500.00 | 362.00 | 862.00 | 450 | 522.04 | 10.441 | 0 |
| T270 | 20 | 30.0 | 3.00 | 500.00 | 374.00 | 874.00 | 450 | 514.87 | 10.297 | 4 |
| T384 | 20 | 30.0 | 3.00 | 400.00 | 412.00 | 812.00 | 450 | 554.19 | 11.084 | 3 |
| T384 | 20 | 30.0 | 3.00 | 400.00 | 422.00 | 822.00 | 450 | 547.45 | 10.949 | 3 |
| T384 | 20 | 30.0 | 3.00 | 400.00 | 450.00 | 850.00 | 450 | 529.41 | 10.588 | 4 |
| T384 | 20 | 30.0 | 3.00 | 400.00 | 430.00 | 830.00 | 450 | 542.17 | 10.843 | 4 |
| T384 | 20 | 30.0 | 3.00 | 500.00 | 372.00 | 872.00 | 450 | 516.06 | 10.321 | 3 |
| T384 | 20 | 30.0 | 3.00 | 500.00 | 380.00 | 880.00 | 450 | 511.36 | 10.227 | 4 |

The sample cages were removed separately when emptying the decaffeination system. Approx. 500 g of decaffeinated, presoaked green coffee beans was taken from each of the sample cages. In the laboratory, the moisture content of the decaffeinated, presoaked green coffee beans was determined directly by NIR analysis (near-infrared spectroscopy). After drying, the caffeine content was determined in accordance with ISO 20481.

The results of these experiments are summarized in Tables 6a and 6b and plotted in graph form in FIG. 8.

TABLE 6a

Results for example 2

| | PEF | | | Reference | | | Batch cut | | |
|---|---|---|---|---|---|---|---|---|---|
| | Moisture content [% by weight] | Caffeine [% by weight] | Caffeine in DM [% by weight] | Moisture content [% by weight] | Caffeine [% by weight] | Caffeine in DM [% by weight] | Moisture content [% by weight] | Caffeine [% by weight] | Caffeine in DM [% by weight] |
| T171 | 54.2 | 0.0345 | 0.075 | 50.2 | 0.044 | 0.088 | 11 | 0.069 | 0.078 |
| T270 | 51.2 | 0.2885 | 0.591 | 51.1 | 0.306 | 0.626 | 11.5 | 0.476 | 0.538 |
| T384 | 45.3 | 0.0338 | 0.062 | 45.6 | 0.037 | 0.068 | 10 | 0.063 | 0.070 |

TABLE 6b

Results for example 2

| | Caffeine difference (Reference − PEF) [%] | Caffeine difference relative [%] |
|---|---|---|
| T171 | 0.013 | 14.6 |
| T270 | 0.036 | 5.7 |
| T384 | 0.006 | 9.1 |
| Mean | | 9.8 |

The decaffeinated, PEF-treated, presoaked green coffee beans in each case have a lower caffeine content than the decaffeinated, non-PEF-treated, presoaked green coffee beans of the same batch (with otherwise identical treatment).

Example 3: Batchwise PEF Treatment

For use in the decaffeination of green coffee with liquid $CO_2$, a PEF unit was by way of example directly integrated into the existing industrial process for decaffeination. Using this test setup, entire coffee batches of approx. 4000 kg of presoaked green coffee were PEF-treated and compared with reference batches that had not been PEF-treated.

The green coffee was hydrated in a hydration tank with an aqueous swelling liquid to a moisture content of 42 to 45% and then fed directly into a stream of water that was fed through the PEF treatment cell. For the PEF-treated batches, the PEF apparatus was switched on and PEF treatment (according to the parameters in Table 7) carried out; for the reference batches, the cell was not switched on, consequently these underwent the same process path without PEF treatment.

TABLE 7

| | Moisture content after [%] | Mass (coffee) [kg] | Treatment time [h] | Coffee flow [kg/h] | Actual flow [kg/h] | Actual energy input [kJ/L] | Pulse field strength [kV/cm] | Voltage [%] | Power [%] |
|---|---|---|---|---|---|---|---|---|---|
| T288 | 45 | 5208 | 2.12 | 2460.5 | — | — | 2.9 | 90 | 80 |
| T333 | 45 | 4864 | 2.15 | 2262.3 | — | — | 2.8 | 90 | 80 |
| T358 | 45 | 4862 | 2.23 | 2177.0 | — | — | 2.9 | 90 | 80 |
| T675 | 45 | 4870 | 2.03 | 2395.1 | 6377 | 14.9 | 2.9 | 90 | 80 |
| T698 | 42 | 4636 | 2.22 | 2091.4 | 6218 | 15.4 | 2.9 | 90 | 80 |
| T731 | 42 | 4612 | 2.12 | 2178.9 | 6128 | 15.5 | 2.8 | 90 | 80 |
| T745 | 42 | 4620 | 1.95 | 2369.2 | 5769 | 16.4 | 2.9 | 90 | 80 |
| T762 | 42 | 4626 | 2.10 | 2202.9 | 6269 | 15.3 | 2.9 | 90 | 80 |

The adhering water was then separated from the coffee beans with a spiral dryer and a blower and returned to the upstream tank, whereas the coffee was transported directly to the decaffeination column. In the decaffeination column, caffeine was extracted with liquid $CO_2$ as extractant.

Example 4: Batchwise Drying

After decaffeination as described in example 3 had been carried out, the coffee first underwent vacuum drying to a residual moisture content of 30 to 38% and was then dried by fluidized-bed drying to a residual moisture content of 9 to 12%, polished, and removed from the apparatus.

The drying rates of the two drying steps for the PEF-treated batches and the reference batches were calculated from drying loss and drying time and compared; the results are summarized in Table 8 and shown in graph form in FIG. 9 (for vacuum drying) and FIG. 10 (for fluidized-bed drying).

TABLE 8

Drying rates for example 4

| | Drying rate Vacuum drying [kg/min] | | Drying rate Fluidized-bed drying [kg/min] | |
|---|---|---|---|---|
| | PEF | Reference | PEF | Reference |
| T675 | 2.93 | 2.91 | 4.13 | 3.57 |
| T745 | 3.38 | 2.88 | 4.54 | 3.91 |
| T762 | 2.85 | 2.65 | 4.25 | 2.81 |

The drying rates in the vacuum drying (here drying from approx. 45% moisture to approx. 35% moisture) show a slight increase in drying rate in the PEF-treated, presoaked, decaffeinated green coffee beans (under otherwise identical drying conditions) compared to the respective reference samples.

The drying rates in the fluidized-bed drying (here drying from approx. 35% moisture to approx. 11% moisture) show an advantageous increase of approx. 0.7 kg/min in drying rate for the PEF-treated decaffeinated, presoaked green coffee beans (under otherwise identical drying conditions). Such an advantageous increase in drying rate allows more swift drying and thus gentler treatment of the coffee and associated advantageous taste properties. In addition, less energy is needed for the same drying result. In addition, less time is required for drying the PEF-treated, presoaked green coffee beans, which means that a higher overall production output can be achieved for the system.

Example 5: Caffeine Content of Batches of Green Coffee Beans Decaffeinated According to Example 3 and Dried According to Example 4

The caffeine content of green coffee beans PEF-treated and decaffeinated according to example 3 and dried according to example 4 was determined in each case in accordance with ISO 20481; corresponding reference samples that had undergone the same process except for the PEF treatment were measured as reference samples, likewise in accordance with ISO 20481. Results are summarized in Table 9 and shown in graph form in FIGS. 11a and 11b.

TABLE 9

Results of batchwise PEF treatment

| | Caffeine content Reference [% by weight] | Caffeine content PEF [% by weight] | Difference in caffeine content (Reference − PEF) [% by weight] | Difference in caffeine content relative [%] |
|---|---|---|---|---|
| T358 | 0.063 | 0.055 | 0.008 | 12.7[15] |
| T333 | 0.063 | 0.044 | 0.019 | 30.7 |
| T288 | 0.320 | 0.217 | 0.103 | 32.1 |
| T762 | 0.059 | 0.053 | 0.006 | 10.2 |
| T745 | 0.063 | 0.05 | 0.013 | 20.6 |
| T731 | 0.053 | 0.042 | 0.011 | 20.8 |
| T698 | 0.054 | 0.042 | 0.012 | 22.2 |

The PEF-treated batches were (under otherwise identical conditions) decaffeinated more strongly and compared in each case to roasted coffee beans of the same type and batch that had previously undergone the same process steps, but without PEF treatment; the arithmetic mean over all batches shows an improvement of 16.6%.

More efficient decaffeination is felt to be extremely beneficial in the field of the present invention. This allows lower caffeine values to be achieved more easily or allows, with shorter extraction times, such advantageous decaffeination results to be achieved for PEF-treated green coffee beans for which longer extraction times are necessary in the case of non-PEF-treated green coffee beans; here too, PEF treatment allows a higher overall production output to be achieved for the corresponding system.

Example 6: PEF Treatment Prior to Decaffeination With Dichloromethane

First, green coffee beans of the "Robusta" and "Arabica" types were in a glass reactor hydrated with steam (150 g steam for 500 g coffee beans) to approx. 32%, with the result that presoaked green coffee beans were obtained. The presoaked green coffee beans then underwent PEF treatment with approx. 10 kJ/kg in the water-filled treatment cell of a stationary laboratory PEF device, with the result that PEF-treated, presoaked green coffee beans were obtained. The PEF treatment parameters used are shown in Table 10. A reference sample of the same batch of presoaked green coffee was during this time kept in a water bath without PEF treatment to ensure comparable test conditions for the reference batch.

TABLE 10

Parameters for PEF treatment

|  | Pulse | Voltage [kV] | Field strength [kV/cm] | Mass (coffee) [g] | Mass (water) [g] | Mass (in cell) [g] | Energy [J] per pulse | Energy [J/kg] per pulse | Specific energy [kJ/kg] |
|---|---|---|---|---|---|---|---|---|---|
| Robusta | 20 | 30.0 | 3.00 | 400.00 | 431.00 | 831.00 | 450 | 538.72 | 10.820 |
| Arabica | 20 | 30.0 | 3.00 | 400.00 | 427.00 | 827.00 | 450 | 550.91 | 11.021 |

Example 7: Caffeine Extraction With Dichloromethane as Extractant 10 g of PEF-treated, presoaked green coffee beans or of non-PEF-treated, presoaked green coffee beans were weighed out of coffee beans pretreated according to example 6 and transferred to a Soxhlet extraction thimble.

A Soxhlet extraction with 70 mL of dichloromethane was then initiated at 60° C., 70° C., or 80° C. Soxhlet extraction is a common continuous extraction technique in which soluble constituents are extracted from solid extraction material according to the drain siphon principle in cycles with fresh solvent, in this case dichloromethane. After defined extraction times, the extraction was in each case terminated. A number of test series were carried out for the PEF-treated, presoaked green coffee beans and for the reference samples (non-PEF-treated, presoaked green coffee beans) at 60° C. and 70° C.

The residual caffeine content in the extracted coffee beans and the extracted caffeine content in the extract were then determined. For this, the extracted coffee beans were dried in a hood at room temperature to a moisture content of approx. 11% (+/−1%) and the caffeine content was determined in accordance with ISO 20481. The extract was concentrated in a rotary evaporator and taken up quantitatively in double-distilled water. The caffeine content of the aqueous solution thus obtained was determined in accordance with ISO 20481.

Example results are summarized in Table 11. In addition, data points for an extraction of a Robusta coffee over 380 min at 70° C. are shown by way of example in FIG. 12a and in FIG. 12b.

TABLE 11

Caffeine content after Soxhlet extraction with dichloromethane

|  |  | Caffeine content in the coffee bean |  |  |
|---|---|---|---|---|
| Extraction Temperature [° C.] | Total extraction time [min] | Average difference [%] | Min. difference [%] | Max. difference [%] |
| Robusta 60 | 120 | 13.8 | 8.9 | 18 |
| Arabica 60 | 120 | 16.8 | 7.9 | 26 |
| Robusta 70 | 360 | 21.9 | 2.4 | 36.6 |
| Arabica 80 | 360 | 14.9 | 3.1 | 27.4 |

Through prior PEF treatment it was possible to extract from the "Robusta" and "Arabica" test coffee beans examined here by way of example under otherwise identical conditions an average of 16.9% more caffeine compared to the corresponding non-PEF-treated reference samples. Dichloromethane was chosen here as the extractant purely by way of example; the person skilled in the art will here select a suitable extractant according to the needs in the individual case.

More efficient decaffeination is felt to be extremely beneficial in the field of the present invention. This allows lower caffeine values to be achieved more easily or allows, with shorter extraction times, such advantageous decaffeination results to be achieved for PEF-treated green coffee beans for which longer extraction times are necessary in the case of non-PEF-treated green coffee beans; here too, PEF treatment allows a higher overall production output to be achieved for the corresponding system.

Example 8: Drying in a Drum Dryer 3 kg of a sample of PEF-treated green coffee decaffeinated according to example 3 and 3 kg of a reference sample decaffeinated according to example 3 (sample and reference sample were taken from a batch of green coffee) were each placed in a drum dryer for drying and dried at 90° C. and 15 Hz. Particularly with drying times of one hour or more and with moisture contents of less than approx. 30%, no significant difference is observed between the PEF-treated sample and the reference sample that had not been subjected to PEF treatment; corresponding data points are plotted in FIG. 13.

Example 9

The water-soluble extractables content (WSE) in green coffee beans and roasted coffee beans of PEF-treated samples and non-PEF-treated comparison samples was determined by way of example for various samples in accordance with DIN 10775-1 (roasted coffee beans) or in accordance with DIN 10775-2 (green coffee beans). The water-soluble extract fraction in green and roasted coffee is understood as meaning the fraction of extractable substances that can be determined gravimetrically by extraction with water and subsequent drying at 103° C. Table 12 shows by way of example the values determined for the water-soluble extract fraction in percent by weight.

Overall, the PEF treatment is surprisingly found to have no significant influence on the water-soluble extract fraction.

TABLE 12

Water-soluble extract fraction

| | Robusta | | Arabica | |
|---|---|---|---|---|
| | PEF | Reference | PEF | Reference |
| Water-soluble extract fraction of green coffee in % (WSE [%]) | | | | |
| WSE [%] | 22.9 | 21.3 | 22.7 | 23.5 |
| Water-soluble extract fraction of roasted coffee in % (WSE [%]) | | | | |
| WSE [%] | 30.6 | 30.9 | 26.7 | 27.7 |

Example 10: Variation of the Specific Energy Introduced

In a process according to example 6, the specific energy (kJ/kg) in the PEF treatment was varied according to Table 13 via the number of pulses at constant field strength for Arabica and for Robusta green coffee beans.

TABLE 13

PEF parameters for variation of the specific energy introduced

| | Pulse | Voltage [kV] | Field strength [kV/cm] | Mass (coffee) [g] | Mass (water) [g] | Mass (in cell) [g] | Energy [J]/ pulse | Energy [J/kg]/ pulse | Specific energy [kJ/kg] |
|---|---|---|---|---|---|---|---|---|---|
| Arabica | 10 | 30.0 | 3.00 | 315.00 | 450.00 | 765.00 | 450 | 588.24 | 5.882 |
| Arabica | 20 | 30.0 | 3.00 | 300.00 | 422.00 | 735.00 | 450 | 538.92 | 10.949 |
| Arabica | 40 | 30.0 | 3.00 | 310.00 | 480.00 | 790.00 | 450 | 569.62 | 22.785 |
| Robusta | 10 | 30.0 | 3.00 | 30.600 | 550.00 | 856.00 | 450 | 525.70 | 5.257 |
| Robusta | 20 | 30.0 | 3.00 | 300.00 | 517.00 | 817.00 | 450 | 550.80 | 11.016 |
| Robusta | 40 | 30.0 | 3.00 | 307.00 | 530.00 | 837.00 | 450 | 537.63 | 21.505 |

Caffeine was then extracted from the treated beans with dichloromethane in a Soxhlet apparatus according to the procedure of example 7. The extraction times were likewise varied; values for the residual caffeine content in the coffee bean after extraction times of 60 minutes and 120 minutes are shown by way of example in FIGS. 14a and 14b.

Example 11: Sensory Characteristics and Cupping

After decaffeination according to example 3 and drying according to example 4 had been carried out, the decaffeinated green coffee (PEF-treated batches and reference batches) was roasted using the same roasting curve to a coffee color value (CV) of 100 (±5). The roasting parameters are shown in Table 14 for some samples by way of example.

TABLE 14

Roasting parameters

| Sample | | Initial weight [g] | End weight [g] | Product temperature [° C.] | Air temperature [° C.] | Air supply [Hz] | Roasting time [s] | Color value [LRU] |
|---|---|---|---|---|---|---|---|---|
| T288 | Reference | 100 | 85 | 218 | 240 | 40 | 155 | 103 |
| T288 | PEF | 100 | 85 | 219 | 240 | 40 | 155 | 102 |
| T333 | Reference | 100 | 85 | 217 | 240 | 40 | 155 | 99 |
| T333 | PEF | 100 | 84 | 215 | 240 | 40 | 155 | 100 |

A difference in roasting behavior between the PEF-treated batches and the non-PEF-treated reference batches was not detected.

To examine the sensory characteristics of the roasted coffee beans, for each sample 11 g portions of the roasted coffee beans were in a triplicate determination ground with a coffee grinder (Mahlkonig VTA6S, grinding level 7) directly into a test vessel (V=200 mL). Fresh tap water was heated to 95° C. in a kettle and poured onto the ground coffee without stirring. After a brewing time of 5 min, the so-called crust was skimmed off and the coffee underwent sensory tasting by a trained sensory panel. More particularly, this was done by assessing the (i) taste, (ii) smell, (iii) acidity, and (iv) body of the infusion. The sensory assessment was carried out in accordance with DIN 10975.

Example results of the tasting are summarized in Table 15. No differences were observed compared to the respective reference samples.

TABLE 15

Sensory characteristics and cupping

| Sample | Sensory characteristics and cupping—Result |
|---|---|
| T288 reference | |
| T288 PEF | No difference |
| T333 reference | |
| T333 PEF | No difference |
| T698 reference | |
| T698 PEF | No difference |
| T745 reference | |
| T745 PEF | No difference |
| T762 reference | |
| T762 PEF | No difference |

Example 12: NMR Analysis

The $^1$H-NMR analysis of the organic phase and of the aqueous phase of decaffeinated PEF-treated samples and corresponding reference samples showed a high degree of comparability.

Example 13: Coliform Bacteria

As part of our own investigations, a process according to the invention was carried out and the contamination of the green coffee beans before step (b-v) (PEF treatment of presoaked green coffee beans) and after step (b-v) (PEF treatment of presoaked green coffee beans) was examined on the basis of the colony-forming units after incubation. The investigation was carried out in accordance with DIN EN ISO 4833-1.

In each case, a smaller number of colony-forming units was found after the PEF treatment than before the investigation.

We claim:

1. A process for producing decaffeinated green coffee beans or decaffeinated roasted coffee beans, comprising the following steps:
    (a-v) optionally presoaking green coffee beans with a liquid for swelling green coffee beans to obtain presoaked green coffee beans,
    (b) subjecting green coffee beans or the presoaked green coffee beans to pulsed electric field (PEF) treatment to obtain PEF-treated green coffee beans, wherein the PEF treatment comprises applying to the green coffee beans or the presoaked green coffee beans a pulse field strength of at least 0.2 kV/cm,
    (c) extracting of caffeine from the PEF-treated green coffee beans using an extraction liquid to obtain decaffeinated, PEF-treated green coffee beans or decaffeinated, PEF-treated, presoaked green coffee beans, and
    (e) optionally roasting the decaffeinated, PEF-treated green coffee beans or decaffeinated, PEF-treated, presoaked green coffee beans to obtain decaffeinated roasted coffee beans.

2. The process as claimed in claim 1, wherein the liquid for swelling the green coffee beans is an aqueous swelling liquid.

3. The process as claimed in claim 1, wherein the extraction liquid is selected from the group consisting of:
    liquid carbon dioxide, supercritical carbon dioxide, dichloromethane, dichloroethane, ethanol, trichloromethane, trichloroethane, acetone, ethyl acetate, methyl acetate, methanol, coffee oil, and water.

4. The process as claimed in claim 3, wherein the extraction liquid is selected from the group consisting of water, ethyl acetate, liquid carbon dioxide, supercritical carbon dioxide, and dichloromethane.

5. The process as claimed in claim 1, comprising an additional step:
    (d) drying of the decaffeinated, PEF-treated green coffee beans or the decaffeinated, PEF-treated, presoaked green coffee beans to obtain dried, decaffeinated green coffee beans, wherein the drying step (d) occurs before the optional roasting step.

6. The process as claimed in claim 5, wherein the drying of the decaffeinated, PEF-treated, green coffee beans or the decaffeinated, PEF-treated, presoaked green coffee beans is carried out by means of a process selected from the group consisting of:
    fluidized-bed processes, vacuum-drying processes, vibration drying, freeze drying, hot-air drying, microwave drying, infrared drying, and combinations thereof.

7. The process as claimed in claim 6, the drying of the decaffeinated, PEF-treated, green coffee beans or the decaffeinated, PEF-treated, presoaked green coffee beans is carried out by means of a process selected from the group consisting of fluidized bed processes, vacuum drying processes, and combinations thereof.

8. The process as claimed in claim 1, wherein the PEF treatment creates irreversible pores in cell membranes and cell walls of the green coffee beans.

9. The process as claimed in claim 1,
    wherein the green coffee beans or the presoaked green coffee beans have a smaller number of coliform bacteria following the PEF treatment than before the PEF treatment
        wherein an amount of coliform bacteria before the PEF treatment is determined according to the methods of ISO 4832, and
        wherein an amount of coliform bacteria after the PEF treatment is determined according to the methods of ISO 4832.

10. The process as claimed in claim 1, wherein the PEF treatment of the green coffee beans or of the presoaked green coffee beans comprises
    applying to the green coffee beans or the presoaked green coffee beans a pulse field strength of at least 1.0 kV/cm,
    and/or
    introducing via a number of pulses at constant field strength an actual energy input of at least 5 kJ/L,
    and/or
    exposing the green coffee beans or the presoaked green coffee beans to at least 5 pulses of a pulsed electric field,
    wherein the green coffee beans or the presoaked green coffee beans at least initially have a moisture content of at least 10
    wherein the moisture content is determined using methods of ISO 6673.

11. The process as claimed in claim 10, comprising applying to the green coffee beans or the presoaked green coffee beans a pulse field strength of at least 1.5 kV/cm.

12. The process as claimed in claim 10, comprising introducing via a number of pulses at constant field strength an actual energy input of at least 15 kJ/L.

13. The process as claimed in claim 10, comprising exposing the green coffee beans or the presoaked green coffee beans to at least 10 pulses of a pulsed electric field.

14. The process as claimed in claim 1,
    wherein the presoaking of green coffee beans with soaking liquid in optional step (a-v) is accompanied by absorption of at least 10% by weight of the soaking liquid based on a total mass of the green coffee beans before the presoaking.

15. The process as claimed in claim 1, wherein the presoaked green coffee beans have a predetermined moisture content.

* * * * *